US012632595B1

(12) United States Patent
Evenhaim et al.

(10) Patent No.: US 12,632,595 B1
(45) Date of Patent: May 19, 2026

(54) SYSTEMS AND METHODS FOR SECURE MATCHING OF ENCRYPTED DATA RECORDS

(71) Applicant: Veeva Systems Inc., Pleasanton, CA (US)

(72) Inventors: Asaf Evenhaim, New York, NY (US); Saar Barhoom, Kiryat Ono (IL); Dikla Dotan, Jerusalem (IL); Keren Elia, Merkaz (IL); Nina Kirshenbaum, Scarsdale, NY (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/368,459

(22) Filed: Oct. 24, 2025

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 4,965,763 A | 10/1990 | Zamora | |
| 5,253,164 A | 10/1993 | Holloway et al. | |
| 5,307,262 A | 4/1994 | Ertel | |
| 5,420,786 A | 5/1995 | Felthauser et al. | |
| 5,491,473 A | 2/1996 | Gilbert | |
| 5,544,044 A | 8/1996 | Leatherman | |
| 5,557,514 A | 9/1996 | Seare et al. | |
| 5,628,530 A | 5/1997 | Thornton | |
| 5,781,893 A | 7/1998 | Felthauser et al. | |
| 5,794,042 A | 8/1998 | Terada et al. | |
| 5,835,897 A | 11/1998 | Dang et al. | |

(Continued)

FOREIGN PATENT DOCUMENTS

| | | |
|---|---|---|
| WO | 0237213 A2 | 5/2002 |

OTHER PUBLICATIONS

Adherence to Long-Term Therapies Evidence for action by the World Health Organization 2003 Attached file name: Adherance report.pdf.

(Continued)

*Primary Examiner* — Farid Homayounmehr
*Assistant Examiner* — Suman Debnath

(57) ABSTRACT

A method for secure matching of data records in a data merging and linking computing system including an identified domain and a deidentified domain. The identified domain stores personally identifiable information (PII), where the deidentified domain does not store PII. The method includes generating a plurality of PII data records and a plurality of transaction data records in the identified domain. The method includes generating, in the identified domain, a PII key for each PII data record of the plurality of PII data records, and matching, in the identified domain, at least two PII keys of the plurality of PII keys. The method includes merging at least two PII data records. The method includes modifying a resulting set of PII data records to generate a plurality of deidentified PII data records. Each deidentified PII data record of the plurality of deidentified PII data records includes a token.

20 Claims, 9 Drawing Sheets

(56) References Cited

U.S. PATENT DOCUMENTS

| | | | |
|---|---|---|---|
| 5,845,255 | A | 12/1998 | Mayaud |
| H1782 | H | 2/1999 | Wicks et al. |
| 5,950,630 | A | 9/1999 | Portwood et al. |
| 6,014,631 | A | 1/2000 | Russel et al. |
| 6,067,523 | A | 5/2000 | Bair et al. |
| 6,223,164 | B1 | 4/2001 | Seare et al. |
| 6,269,404 | B1 | 7/2001 | Hart et al. |
| 6,305,377 | B1 | 10/2001 | Portwood et al. |
| 6,356,873 | B1 | 3/2002 | Russel et al. |
| 6,370,511 | B1 | 4/2002 | Dang |
| 6,397,224 | B1 | 5/2002 | Zubeldia et al. |
| 6,529,952 | B1 | 3/2003 | Blumenau |
| 6,578,003 | B1 | 6/2003 | Camarda et al. |
| 6,584,472 | B2 | 6/2003 | Classen |
| 6,587,829 | B1 | 7/2003 | Camarda et al. |
| 6,611,846 | B1 | 8/2003 | Stoodley |
| 6,636,875 | B1 | 10/2003 | Bashant et al. |
| 7,543,149 | B2 | 6/2009 | Ricciardi et al. |
| 7,657,540 | B1 * | 2/2010 | Bayliss ................... G06Q 10/10 707/726 |
| 7,823,207 | B2 | 10/2010 | Evenhaim |
| 8,577,933 | B2 | 11/2013 | Evenhaim |
| 10,885,225 | B2 * | 1/2021 | Balzer ................. G06F 21/6245 |
| 11,550,956 | B1 * | 1/2023 | Gupta .................... G16H 10/20 |
| 2002/0016923 | A1 | 2/2002 | Knaus et al. |
| 2002/0073138 | A1 * | 6/2002 | Gilbert .................... G16Z 99/00 709/201 |
| 2002/0103806 | A1 | 8/2002 | Yamanoue |
| 2002/0116227 | A1 | 8/2002 | Dick |
| 2002/0120505 | A1 | 8/2002 | Henkin et al. |
| 2004/0172287 | A1 | 9/2004 | O'toole et al. |
| 2006/0026156 | A1 | 2/2006 | Zuleba |
| 2006/0173716 | A1 | 8/2006 | Wang |
| 2007/0061393 | A1 | 3/2007 | Moore |
| 2007/0220611 | A1 | 9/2007 | Socolow et al. |
| 2010/0070298 | A1 | 3/2010 | Kalies |
| 2011/0301982 | A1 | 12/2011 | Green, Jr. et al. |
| 2020/0066386 | A1 | 2/2020 | Katz |
| 2022/0284331 | A1 | 9/2022 | Aispuro et al. |
| 2022/0318613 | A1 | 10/2022 | Nambirajan et al. |
| 2024/0379199 | A1 * | 11/2024 | Srinathan ............... G16H 10/60 |

OTHER PUBLICATIONS

CBI Conference Agenda for Anonymous Patient-Level Data and AnalysisNov. 2003 Attached file name: CBI Conf. on Patient-Level Data.pdf.

Data Rights Agreement Between Quintiles and Healtheon/WebMD Attached file name: WEBMD-QUINTILES DATA SHARING AGREEMENT.pdf.

Dataset De-Identification—A Technical Overview Attached file name: Dataset De-Identification—A Technical Overview.pdfdate Jan. 2003.

International Preliminary Report on Patentability (Report confirms that the inventionis novel, non-obvious, and has utility), date Jun. 29, 2011.

International Search Report & Written Opinion of International Searching Authority-Published Jul. 27, 2010. Please note the ISA's positive opinion that the claims are novel, involve an inventive stepand have industrial applicability.

K-anonymity-A Model for Protecting Privacy Attached file name:K-anonymity—A Model for Protecting Privacy. pdfMay 2002.

Kaushik et al. ("Using LSTMs for Predicting Patient's Expenditure on Medications," 2017 International Conference on Machine Learning and Data Science (MLDS), Naida, India, 2017, pp. 120-127) (Year: 2017).

MTS HealthTrak Inserts Essential 'Why' in Consumer Rx Purchasing Behaviors and Patt Attached filed name: MTS Healthtrak.pdf, Jul. 312006.

NDC Health Pharmaceutical website, as of Nov. 112003 Attached filed name: NDCHealth Pharmaceutical website.pdf.

Pfizer and RxRemedy—the Impact of DTC Advertising Relative to Patient Compliance Attached file name: Pfizer Inc Impact of DTC Advertising.pdfJun. 2001.

Pharmetrics HIPAA Compliance: Statistical Disclosure Limitation Methodology Attached file name: Pharmetrics HIPAA Compliance. pdf, May 142001.

Right-Channeling Consumer Drug Marketing by Forrester Research Attached file name: Right Channeling CD Mark.pdfDec. 2002.

Tools for Privacy Preserving Distributed Data Mining Attached file name: Tools for Privacy Preserving Distributed Data Mining.pdf.

Using De-Identified Information to Simplify Privacy Compliance Attached file name: Legal review of de-identification. pdf.

* cited by examiner

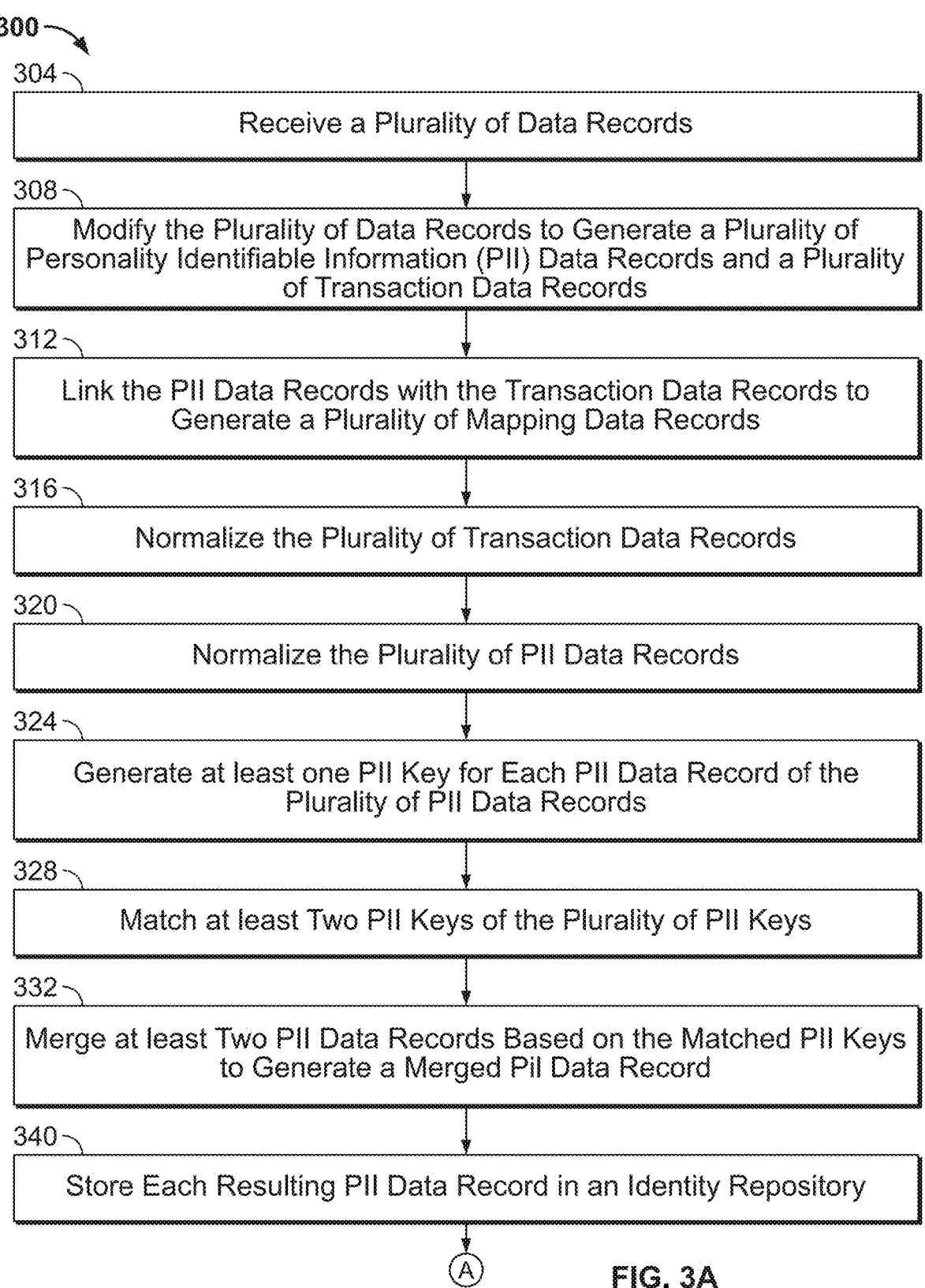

300

304
Receive a Plurality of Data Records

308
Modify the Plurality of Data Records to Generate a Plurality of Personality Identifiable Information (PII) Data Records and a Plurality of Transaction Data Records 312
Link the PII Data Records with the Transaction Data Records to Generate a Plurality of Mapping Data Records 316
Normalize the Plurality of Transaction Data Records 320
Normalize the Plurality of PII Data Records 324
Generate at least one PII Key for Each PII Data Record of the Plurality of PII Data Records 328
Match at least Two PII Keys of the Plurality of PII Keys 332
Merge at least Two PII Data Records Based on the Matched PII Keys to Generate a Merged PII Data Record 340
Store Each Resulting PII Data Record in an Identity Repository

Deidentify the Resulting Set of PII Data Records to Generate a Plurality of Deidentified PII Data Records

352

Store the Deidentified PII Data Records, the Mapping Data Records, and the Transaction Data Records in a Deidentified Zone

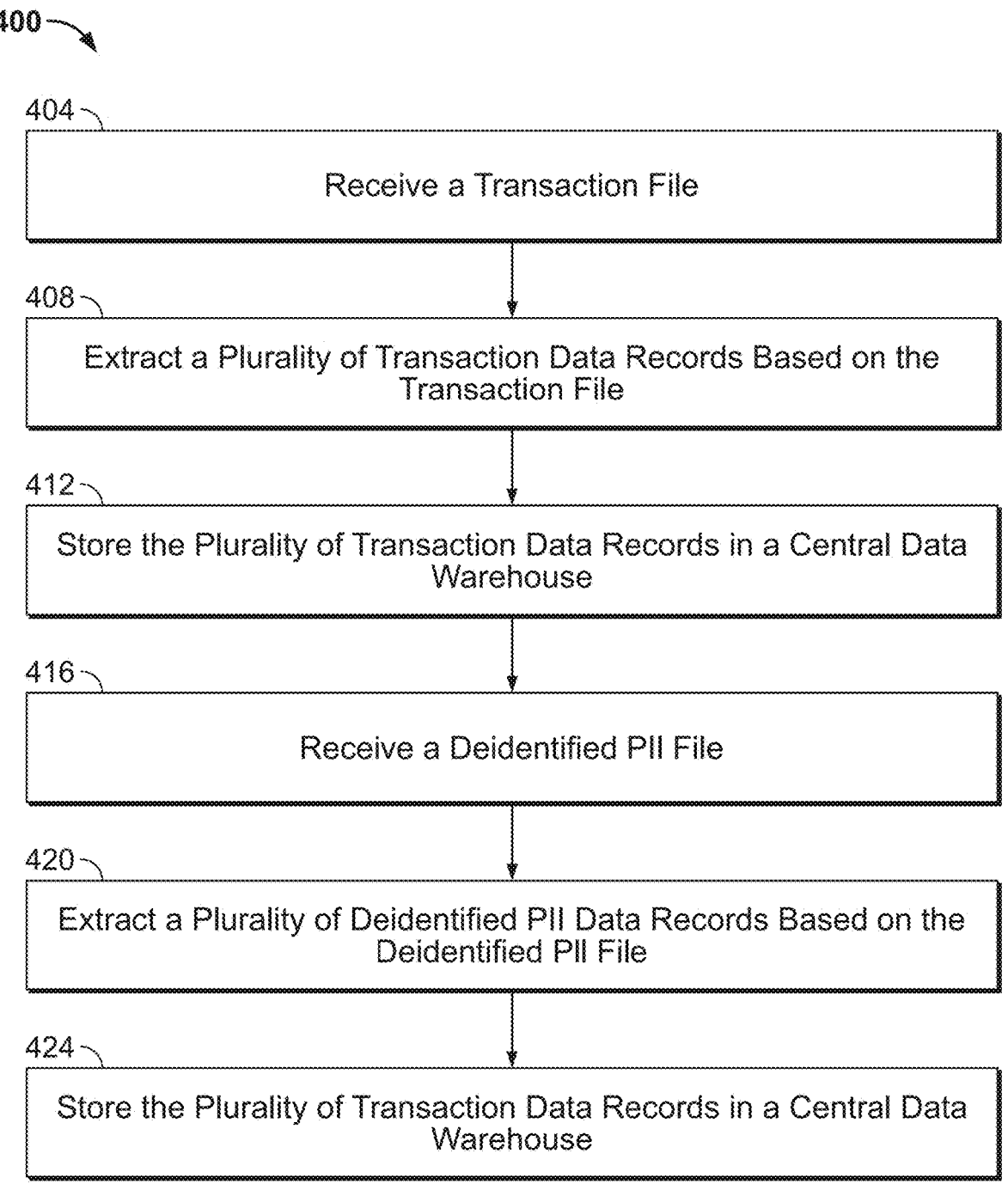

400

404

Receive a Transaction File

408

Extract a Plurality of Transaction Data Records Based on the Transaction File

412

Store the Plurality of Transaction Data Records in a Central Data Warehouse

416

Receive a Deidentified PII File

420

Extract a Plurality of Deidentified PII Data Records Based on the Deidentified PII File

424

Store the Plurality of Transaction Data Records in a Central Data Warehouse

504
Receive a Plurality of Media Exposure Data Records

508
Select a Plurality of Deidentified PII Data Records

512
Match the Plurality Of Media Exposure Data Records with the Plurality of Deidentified PII Data Records 516
Modify the Plurality Of Media Exposure Data Records 520
Store the Modified Plurality of Media Exposure Records in a Central Data Warehouse

700

704 — Receive a Query including Multiple Query Parameters

708 — Determine a Plurality of Deidentified PII Data Records

712 — Select a Plurality of Transaction Data Records Based on the Determined Plurality of Deidentified PII Data Records 716 — Output the Plurality of Transaction Data Records

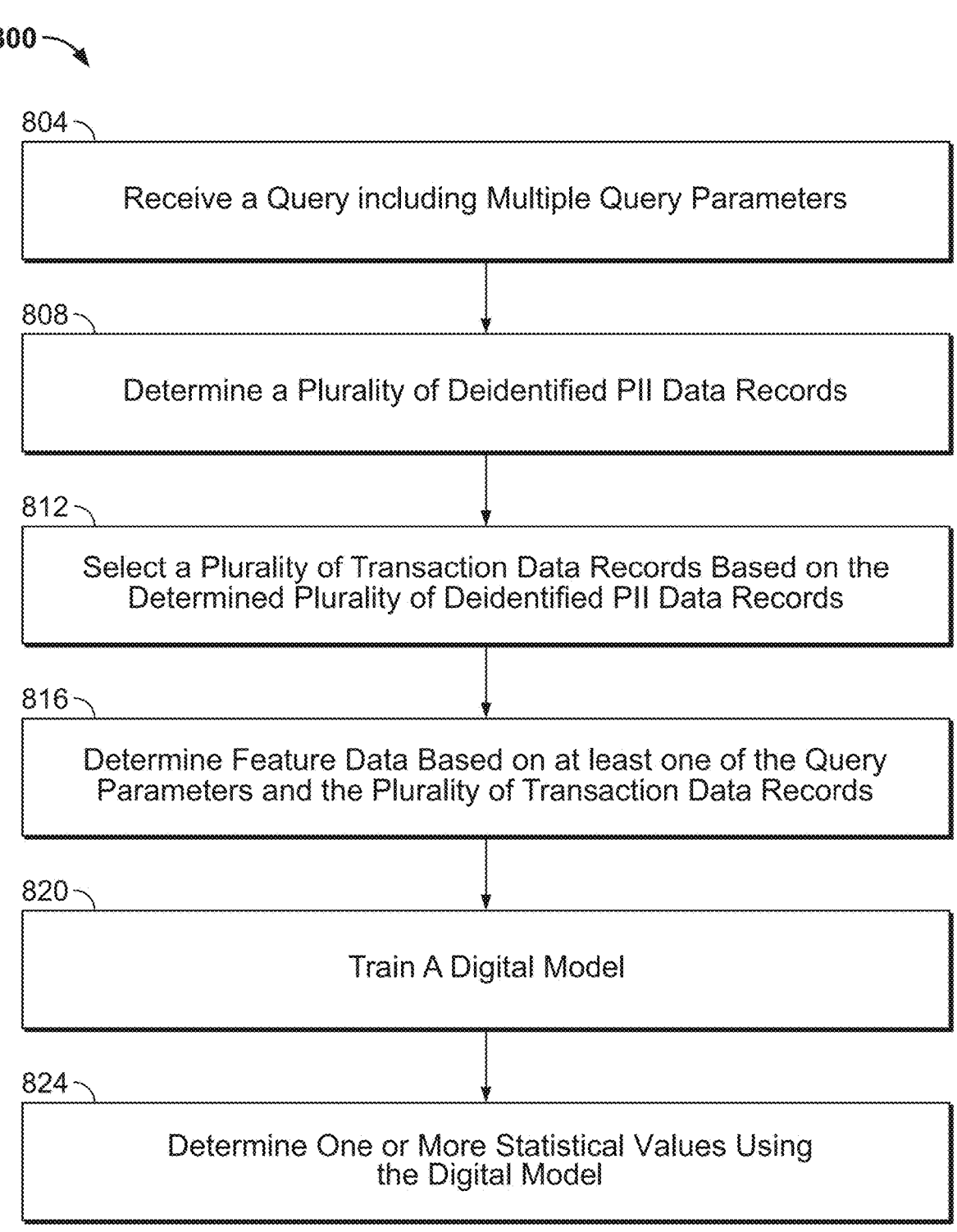

800

804

Receive a Query including Multiple Query Parameters

808

Determine a Plurality of Deidentified PII Data Records

812

Select a Plurality of Transaction Data Records Based on the Determined Plurality of Deidentified PII Data Records

816

Determine Feature Data Based on at least one of the Query Parameters and the Plurality of Transaction Data Records

820

Train A Digital Model

824

Determine One or More Statistical Values Using the Digital Model

FIG. 8

SYSTEMS AND METHODS FOR SECURE MATCHING OF ENCRYPTED DATA RECORDS

TECHNICAL FIELD

The present disclosure relates to systems and methods for secure matching of encrypted data records.

BACKGROUND

Researchers, scientists, industry players, academics, government regulators, and other stakeholders are increasingly in need of ways to perform computations (i.e., match and group) on secure data records within the confines of existing privacy laws.

SUMMARY

One embodiment relates to a method for secure matching of data records in a data merging and linking computing system. The data merging and linking computing system includes an identified domain and a deidentified domain. The identified domain stores personally identifiable information (PII), where the deidentified domain does not store PII. The method includes receiving a plurality of data records in the identified domain. The method further includes modifying the plurality of data records to generate a plurality of PII data records and a plurality of transaction data records in the identified domain. The method further includes linking the plurality of PII data records with the plurality of transaction data records by generating a mapping file in the identified domain. The method further includes normalizing the plurality of transaction data records in the identified domain. The method further includes normalizing the plurality of PII data records in the identified domain. The method further includes generating, in the identified domain, a PII key for each PII data record of the plurality of PII data records. The method further includes matching, in the identified domain, at least two PII keys of the plurality of PII keys. The method further includes merging, in the identified domain, at least two PII data records of the plurality of PII data records based on the matched at least two PII keys to generate at least one merged PII data record. The method further includes modifying a resulting set of PII data records to deidentify the resulting set of PII data records and generate a plurality of deidentified PII data records. The resulting set of PII data records includes one or more PII data records of the plurality of PII data records and the at least one merged PII data record. The method further includes outputting, in the identified domain, at least a portion of each deidentified PII data record of the deidentified PII data records and receiving multiple tokens. The method further includes modifying, in the identified domain, each deidentified PII data record of the deidentified PII data records to include a token of the multiple tokens. The method further includes storing the plurality deidentified PII data records, the plurality of normalized transaction data records, and the mapping file in at least one repository in the deidentified domain.

Another embodiment relates to a method for secure matching of data records in a data merging and linking computing system. The data merging and linking computing system includes an identified domain and a deidentified domain. The identified domain stores personally identifiable information (PII), where the deidentified domain does not store PII. The method includes receiving a plurality of data records in the identified domain. The method further includes modifying the plurality of data records to generate a plurality of PII data records and a plurality of transaction data records in the identified domain. The method further includes linking the plurality of PII data records with the plurality of transaction data records by generating a plurality of mapping data records in the identified domain. The method further includes normalizing the plurality of transaction data records in the identified domain. The method further includes normalizing the plurality of PII data records in the identified domain. The method further includes generating, in the identified domain, a PII key for each PII data record of the plurality of PII data records. The method further includes matching, in the identified domain, at least two PII keys of the plurality of PII keys. The method further includes merging, in the identified domain, at least two PII data records of the plurality of PII data records based on the matched at least two PII keys to generate at least one merged PII data record. The method further includes modifying a resulting set of PII data records to deidentify the resulting set of PII data records and generate a plurality of deidentified PII data records. The resulting set of PII data records includes one or more PII data records of the plurality of PII data records and the at least one merged PII data record. The method further includes generating a token for each deidentified PII data record of the deidentified PII data records. The method further includes modifying, in the identified domain, each deidentified PII data record of the deidentified PII data records to include a token of the multiple tokens. The method further includes storing the plurality deidentified PII data records, the plurality of normalized transaction data records, and the plurality of mapping data records in at least one repository in the deidentified domain.

Another embodiment relates to a non-transitory computer readable medium having computer executable instructions embodied therein that, when executed by at least one processor of a computing system, cause the computing system to perform operations to perform secure matching of data records. The operations include receiving a plurality of data records in the identified domain. The operations further include modifying the plurality of data records to generate a plurality of PII data records and a plurality of transaction data records in the identified domain. The operations further include linking the plurality of PII data records with plurality of transaction data records by generating a mapping file in the identified domain. The operations further include normalizing the plurality of transaction data records in the identified domain. The operations further include normalizing the plurality of PII data records in the identified domain. The operations further include generating, in the identified domain, a PII key for each PII data record of the plurality of PII data records. The operations further include matching, in the identified domain, at least two PII keys of the plurality of PII keys. The operations further include merging, in the identified domain, at least two PII data records of the plurality of PII data records based on the matched at least two PII keys to generate at least one merged PII data record. The operations further include modifying a resulting set of PII data records to deidentify the resulting set of PII data records and generate a plurality of deidentified PII data records. The resulting set of PII data records includes one or more PII data records of the plurality of PII data records and the at least one merged PII data record. Each deidentified PII data record of the plurality of deidentified PII data records includes a token. The operations further include storing the plurality deidentified PII data records, the plurality of normalized transaction data records, and the mapping file in at least one repository in the deidentified domain.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 3A and 3B are a flow diagram of a method for processing raw data records to generate deidentified personally identifiable (PII) data records and transaction data records, according to an example embodiment.

FIG. 4 is a flow diagram of a method for extracting data records from files and storing the data records, according to an example embodiment.

FIG. 8 is a flow diagram of a method for executing a query on a central data warehouse and generating a digital model, according to an example embodiment.

DETAILED DESCRIPTION

Figure 1:
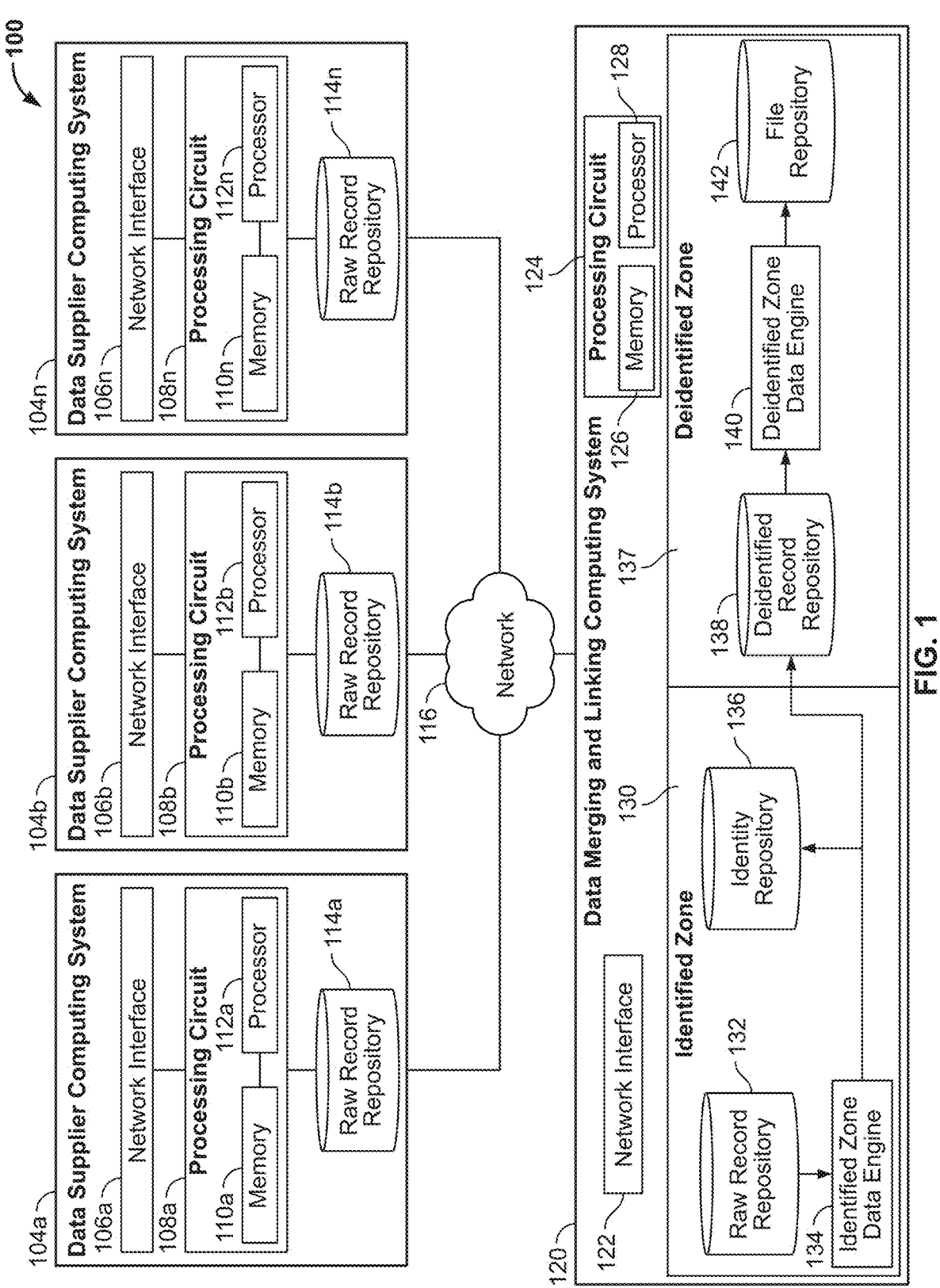
FIG. 1 is a component diagram of a data merging and link system, according to an example embodiment.

Referring generally to the figures, systems and methods for secure matching of encrypted data records are disclosed. The systems and methods described herein improved data security by utilizing an identified zone where private health information (PHI) is processed and stored and a deidentified zone where PHI is not stored or processed. By utilizing an identified zone that includes and stores PHI and a deidentified zone that does not include or store PHI, the present systems and methods provide a technical improvement to security architectures as well as enhanced security and compliance. For instance, by clearly defining the identified zone and the deidentified zone, the present systems and methods can verifiably limit the number of users and services that can ever see raw PHI, minimizing the scope of a potential data breach and simplifying compliance audits. Likewise, by having two separate zones, the present systems and methods can utilize differentiated encryption and security protocols. For instance, the identified zone can use the strongest, most complex encryption algorithms (e.g., AES-256) and extra security for data access, whereas the deidentified zone may use simpler or different encryption mechanisms, reducing the key management overhead and potential latency for high-volume analysis tools. Accordingly, by separating keys and encryption methodologies, the present systems and methods provide for improved security of the PHI. For instance, a compromise of the keys for the deidentified zone does not expose the identified zone, providing an additional layer of security and protection.

The systems and methods described herein further provide for improved security of customer data records by utilizing access keys. For instance, by securing customer data records stored in a central data warehouse via an access key, the present systems and methods provide for additional security to access, modify, or retrieve customer data records, which provides for more secure storage of data records overall by preventing bad actors from retrieving. Likewise, by utilizing the access key to provision access to the data records of the central data warehouse, the present systems and methods provide for additional security by improving traceability of access to the data records. For instance, because each customer uses a unique access key, the present systems and methods can determine which customer (and/or user) is requesting the customer's data records, thereby providing for improved security and traceability.

Likewise, by matching data records based on keys, but utilizing a frequency score to remove common keys, the present systems and methods provide for a technical improvement to matching algorithms and data deduplication techniques by utilizing keys that are likely to result in a unique match and not return a false positive. For instance, because the present systems and methods calculate a frequency score associated each field and/or key and then eliminate or strike certain keys based on the frequency scores, the present systems and methods do not attempt to perform matches on keys that are likely to return false positives, thereby using less processing power to perform matches that will return false positives and not actually show a true match. For instance, matching on high-frequency keys generates a massive number of potential record pairs for comparison by the present system. Accordingly, by striking these common keys, the present system spends less time processing and comparing millions of pairs that are likely to be incorrect. This prunes the search space of potential matches, leading to a substantial increase in algorithmic efficiency and a reduction in processing time and power. Likewise, because the keys may be deleted and not saved based on a high frequency score, the present systems and methods use less memory to store keys that will potentially result in false matches.

Moreover, by proactively striking specific, overly frequent matching keys (like common names or generic terms) to avoid false matches, the present systems provide for improved precision and a reduction in false positives within data linkage and entity resolution systems. For instance, highly frequent keys (high-frequency keys), such as common last names ("Smith," "Lee") or generic address elements ("Main Street," "Avenue"), have a low discriminative power. Matching on these keys alone often results in linking records that belong to different entities (false positives). Accordingly, by striking or down-weighting these keys and forcing the system to rely on less frequent, more unique combinations of keys (e.g., date of birth+rare middle name+specific ZIP code), the process ensures that matches are based on stronger, less ambiguous evidence which directly increases the precision of the match results.

Additionally, because the present systems and methods utilize a common token or hashed value across data records, the systems described herein can make associations across all the received data records while protecting the patients' identities based solely on the deidentified PII, which reduces the complexity of the analysis of the data, and therefore requires less processing power by the systems described herein. For example, instead of having to associate separately received data records (e.g., transaction data records, media exposure data records, consumer data records, etc.) based on multiple matching attributes (e.g., zip code, type of medical coverage, cost of medical procedure, etc.), the systems described herein can associate the separately received data records based solely on the deidentified PII (e.g., the token), due to the consistent deidentification.

As described herein, "data record" "raw data record," or "health data record" can include transaction data (prescription claim (Rx) data, medical claim (Mx) data), electronic health records (EHR), private health information (PHI), or private health information (PHI). For instance, each "data record" "raw data record," or "health data record" may be an Rx data record that includes data pertaining to a prescription claim such as a patient's identifying data (e.g., name, date of birth, social security, address, etc.), diagnosis data (e.g., an International Classification of Diseases-10 (ICD-10) diagnosis code), procedure data (e.g. an Healthcare Common Procedure Coding System (HCPCS) procedure code, a Current Procedural Terminology (CPT) code, etc.), insurance data (e.g., group ID), pharmacy data (e.g., address, a national provider identifier (NPI) associated with the pharmacy), prescriber data (e.g., prescribing prescriber NPI, prescriber name, prescriber drug enforcement agency (DEA) number, etc.), prescription or medical product data (e.g., Rx number, medical product identifier or national drug code (NDC), quantity of the medical product, etc.), financial data (e.g., cost), and the like.

In another example, each "data record" "raw data record," or "health data record" may be an Mx data record that includes data pertaining to a medical claim such as a patient data (e.g., name, date of birth, social security, address, etc.), electronic health records (EHR), insurance data (e.g., group ID), pharmacy data (e.g., address, a national provider identifier (NPI) associated with the pharmacy), diagnosis data (e.g., an International Classification of Diseases-10 (ICD-10) diagnosis code), procedure data (e.g. an Healthcare Common Procedure Coding System (HCPCS) procedure code, a Current Procedural Terminology (CPT) code, etc.), prescriber data (e.g., prescribing prescriber NPI, prescriber name, prescriber drug enforcement agency (DEA) number, etc.), medical product data (e.g., Rx number, medical product identifier or national drug code (NDC), quantity of the medical product, etc.), financial data (e.g., cost), and the like.

In this regard, the "transaction data record" will be described further herein, but may be a data record including an identifier (e.g., a unique identifier (UID)) and the transactional or non-identifying portions of the health data record such as the pharmacy data, diagnosis data, procedure data, prescriber data, medical product data, financial data, and the like. In comparison, the "personably identifiable information (PII) data record," or "identity data record" may be a data record including an identifier (e.g., a UID) and the identifying portions of the health data record such as the patient data, the EHR, insurance data, and the like.

As described herein, "prescriber data" health care prescriber (HCP) data," or "HCP data records" can include data on related to an HCP such as an NPI of the HCP, a name of the HCP, an address of the HCP, a specialty of the HCP (e.g., Cardiology), a place of employment of the HCP (e.g., Johns Hopkin's hospital, X Medical Group, an address including zip code and/country, etc.), HCP location information (e.g., an address including zip code and/or country, a location of the HCP's employer or primary health care organization (HCO), a country of residence or employment of the HCP, etc.) associated with the HCP, a type, degree, or certification held by the HCP (e.g., Doctor of Medicine, Registered Nurse, Nurse Practitioner, etc.), and other information described herein as being associated or related to an HCP.

As used herein, "media exposure data" or "media exposure data records" can include information related to media or communications that an HCP or a patient of an HCP was exposed to such as a marketing email the HCP was exposed to, an advertisement the HCP was exposed to, a call the HCP received, an interactive virtual aid (IVD) the HCP was exposed to, a print advertisement the HCP was exposed to, a site visit the HCP was exposed to (e.g., a sales representative visiting the HCP), a website or search result the HCP was exposed to, attendance information on a conference the HCP attended, and other advertisement or media information. In this regard, "media exposure data" or "media exposure data records" can include information indicating whether the HCP or a patient of the HCP was exposed to media or electronic media described herein. For example, "media exposure data" or "media exposure data records" can include call records, video call records, IVD records, email records, advertisement records (e.g., an ID (anonymous or otherwise) indicated as having viewed or watched a specific advertisement (e.g., a banner ad, a TV ad, a digital ad, etc.), a date the exposure occurred, a time the exposure occurred, and the like.

Further, "media exposure data" or "media exposure data records" can include information indicating whether the HCP or a patient of the HCP was exposed to a combination of one or more media exposure within a set period of time. For example, "media exposure data" or "media exposure data records" may include information indicating the HCP received a call and then a marketing email within seven days (a week) of the call. In some embodiments, "media exposure data" or "media exposure data records" may further include or be associated with medical product information that identifies the medical product the media exposure was promoting or in relation to. For example, the "media exposure data" or "media exposure data records" may indicate an email, call, site visit, and the like was in regard to a specific brand of a medical product or a specific medical products in general.

As used herein, the terms "information" and "data" may be used interchangeably.

Referring now to FIG. 1, a system 100 for secure intake, tokenization, and management of raw data records on a secure healthcare network, according to an example embodiment. The system 100 includes multiple data supplier computing systems 104a-104n and a data merging and linking computing system 120 connected by a secure network (e.g., a network 116). In some embodiments, the system 100 may include multiple data merging and linking computing systems 120.

The network 116 communicably and operably couples the multiple data supplier computing systems 104a-104n and the data merging and linking computing system 120 such that communicable and operable computing may be provided between the multiple data supplier computing systems 104a-104n and the data merging and linking computing system 120 over the network 116. In various embodiments, the network 116 includes any combination of a local area network (LAN), an intranet, the Internet, or any other suitable communications network, directly or through another interface. In some embodiments, the network 116 is a private LAN network or intranet such that the data on the network 116 is separate from the World-Wide Web. In some embodiments, the network 116 is a secure healthcare network associated with a "covered entity" under the Health Insurance Portability and Accountability Act (HIPAA) or other health data laws. For instance, the network 116 may be a HIPAA-compliant (or other health information data law-compliant) network.

In this regard, the network 116 may provide for encrypted data that is encrypted in transit through encryption protocols like Transport Layer Security (TLS) to secure data as it moves across the network 116, as well as the encryption of data stored on servers, hard drives, and mobile devices via encryption protocols like Advanced Encryption Standard (AES) 256-bit encryption is the industry standard for this purpose. Likewise, the network 116 may include a firewalls such as a hardware and software firewalls to filter network traffic and prevent unauthorized access to the network 116 from the internet.

The data supplier computing systems 104a-104n may provide for the intake and processing of raw data records (also referred to as "data records") and be operated by, be managed by, and/or operate on a data network (e.g., the network 116) of a "covered entity" as defined by the Health Insurance Portability and Accountability Act of 1996 (HIPAA) (or other laws that protect health information). For example, the covered entity may be a pharmacy chain (e.g., a pharmacy company) with access to prescription claims information, a medical claims company (e.g., a medical insurance company) with access to medical claims information, a medical provider with access to electronic health records, or a government entity with access to national health insurance (e.g., Medicare or Medicaid) claims information, and the like. In this regard, the data supplier computing systems 104a-104n may receive raw data records, process the raw data records (e.g., clean the raw data records), and store the raw data records in the raw data record repository (e.g., 114a-114n). The raw data records may include raw sets of health data (e.g., Rx claims data, Mx claims data, EHR). As shown, each of the data supplier computing systems 104a-104n may include a network interface (e.g., 106a-106n), a processing circuit (e.g., 108a-108n), and a raw data record repository (e.g., 114a-114n).

The network interfaces 106a-106n are structured to establish connections with the data merging and linking computing system 120 by way of the network 116. The network interfaces 106a-106n include program logic and/or hardware-based components that connect the data supplier computing systems 104a-104n to the network 116. For example, the network interfaces 106a-106n may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interfaces 106a-106n may includes the hardware and machine-readable media structured to support communication over multiple channels of data communication (e.g., wireless, Bluetooth®, near-field communication (NFC). In some embodiments, the network interfaces 106a-106n may include cryptography logic and capabilities to establish a secure communications session.

Each processing circuit (e.g., 108a-108n), as shown, comprises a memory (e.g., 110a-110n) and a processor (e.g., 112a-112n) The memories 110a-110n each include one or more memory devices (e.g., RAM, NVRAM, ROM, flash memory, hard disk storage, etc.) that store data and/or computer code for facilitating the various processes described herein. That is, in operation and use, the memories 110a-110n stores at least portions of instructions and data for execution by the respective processor (e.g., 112a-112n) to control the respective processing circuit (e.g., 108a-108n). The memories 110a-110n may be or include tangible, non-transient volatile memory and/or non-volatile memory. The processors 112a-112n may be implemented as a general-purpose processor, an application specific integrated circuit (ASIC), one or more field programmable gate array (FP-GAs), a digital signal processor (DSP), a group of processing components or other suitable electronic processing components.

Each raw record repository (e.g., 114a-114n) is a repository (e.g., a database) that receives, stores, and manages raw data records. In operation, each raw record repository (e.g., 114a-114n) is configured to receive and store raw data records. For instance, one raw data record repository (e.g., 114a) may receive and store raw data records for a specific location (e.g., pharmacy at 123 W Mill Rd, Medical claim dispensary at 123 W Mill Rd) and/or transaction type (e.g., Rx transactions, Mx transactions). To do so, each raw record repository (e.g., 114a-114n) can be structured according to various database types, such as, relational, hierarchical, network, flat, point-in time, and/or object relational. In some embodiments, each raw record repository 114a-114n includes a plurality of nonvolatile/non-transitory storage media such as solid-state storage media, hard disk storage media, virtual storage media, cloud-based storage drives, storage servers, and/or the like.

Still referring to FIG. 1, the data merging and linking computing system 120 may include a computer system (e.g., one or more servers each with one or more processing circuits) and be operated by, be managed by, and/or operate on a data network (e.g., the network 116) of a "covered entity" as defined by the Health Insurance Portability and Accountability Act of 1996 (HIPAA) (or other laws that protect health information). For example, the covered entity may be a pharmacy chain (e.g., a pharmacy company) with access to prescription claims information, a medical claims company (e.g., a medical insurance company) with access to medical claims information, a medical provider with access to electronic health records, or a government entity with access to national health insurance (e.g., Medicare or Medicaid) claims information, and the like. As shown, the data merging and linking computing system 120 may include a network interface 122, a processing circuit 124, an identified zone (also referred to as a domain or sandbox) 130, and a deidentified zone (also referred to as a domain or sandbox) 137.

The network interface circuit 122 is structured to establish connections with the data supplier computing systems 104a-104n by way of the network 116. The network interface 122 includes program logic and/or hardware-based components that connect the data merging and linking computing system 120 to the network 116. For example, the network interface 122 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 122 includes the hardware and machine-readable media structured to support communication over multiple channels of data communication (e.g., wireless, Bluetooth®, near-field communication (NFC). In some embodiments, the network interface 122 includes cryptography logic and capabilities to establish a secure communications session.

The processing circuit 124, as shown, comprises a memory 126 and a processor 128. The memory 126 includes one or more memory devices (e.g., RAM, NVRAM, ROM, flash memory, hard disk storage, etc.) that store data and/or computer code for facilitating the various processes described herein. That is, in operation and use, the memory

126 stores at least portions of instructions and data for execution by the processor 128 to control the processing circuit 124. The memory 126 may be or include tangible, non-transient volatile memory and/or non-volatile memory. The processor 128 may be implemented as a general-purpose processor, an application specific integrated circuit (ASIC), one or more field programmable gate array (FP-GAs), a digital signal processor (DSP), a group of processing components or other suitable electronic processing components.

The identified zone 130 and the deidentified zone 137 are each data zones or sandboxes in which the data contained therein (e.g., for processing, managing, modifying, etc.) is identified (e.g., in the identified zone 130) or deidentified (e.g., in the deidentified zone). For instance, the identified zone 130 may receive raw transaction data records, mapping data records, and personably identifiable information (PII) data records that include health information and/or PII and therefore are equivalent to protected health information (PHI). In comparison, the deidentified zone 137 may receive deidentified PII data records, transaction data records, and deidentified mapping data records that do not include PII or other identifiable information, such that the deidentified zone 137 does not include PHI therein. The arrows of the identified zone and deidentified zone show the flow of data.

In some embodiments, identified zone 130 is an automated zone where data can be received and output, but the data therein cannot be otherwise accessed. For instance, because the identified zone 130 includes PHI, the data merging and linking computing system 120 may not be able to access the data or processes therein. For instance, raw data records may be provided to the identified zone 130, while deidentified PII records, transaction data records, and mapping data records may be received from the identified zone 130. However, the ETL computing system 204 may not access or otherwise retrieve other data stored therein (e.g., the PII data records, the identities of the identity repository 136, etc.). For instance, the identity repository 136 may only be accessed by the identified zone data engine 134 (and not other circuits of the data merging and linking computing system 120) In this regard, the identified zone 130 may provide for protection of the PHI stored therein and prevent unauthorized actors from accessing the data stored therein. In comparison, the data merging and linking computing system 120may access the data stored in the deidentified zone 137 because it does not include PHI. In this regard, the data merging and linking computing system 120 may retrieve data from the deidentified record repository 138 and the file repository 142.

By utilizing an identified zone that includes and stores PHI and a deidentified zone that does not include or store PHI, the present systems and methods provide a technical improvement to security architectures as well as enhanced security and compliance. For instance, by clearly defining the identified zone and the deidentified zone, the present systems and methods can verifiably limit the number of users and services that can ever see raw PHI, minimizing the scope of a potential data breach and simplifying compliance audits. Likewise, by having two separate zones, the present systems and methods can utilize differentiated encryption and security protocols. For instance, the identified zone 130 can use the strongest, most complex encryption algorithms (e.g., AES-256) and extra security for data access, whereas the deidentified zone 137 may use simpler or different encryption mechanisms, reducing the key management overhead and potential latency for high-volume analysis tools. Accordingly, by separating keys and encryption methodologies, the present systems and methods provide for improved security of the PHI. For instance, a compromise of the keys for the deidentified zone 137 does not expose the identified zone 130, providing an additional layer of security and protection.

The identified zone 130 includes a raw record repository 132, a data engine (e.g., the identified zone data engine 134), and an identity repository 136. The identified zone data engine 134 will be described further herein, but may include multiple other data engines, circuits, or controllers therein, to retrieve and intake raw data records. For instance, the identified zone data engine 134 may retrieve or receive raw data records from each of the data supplier computing systems 104a-104n and store them in the raw record repository 132. Next, the identified zone data engine 134 may split the raw data records into transaction data records and PII data records and normalize each set. The identified zone data engine 134 may then generate PII tokens and deduplicate the PII data records based on the PII tokens. Next, the identified zone data engine 134 may generate mapping data records and deduplicate each of the data records. Then, the identified zone data engine 134 may store the deduplicated data records in a repository (e.g., the deidentified record repository 138).

The raw record repository 132 may be similar to the raw records repositories 114a-114n and receive, store, and manage raw data records. In operation, the raw record repository 132 may receive raw data records from one or more of the raw data record repositories 114a-114n. To do so, the raw record repository 132 can be structured according to various database types, such as, relational, hierarchical, network, flat, point-in time, and/or object relational. In some embodiments, the raw record repository 132 includes a plurality of nonvolatile/non-transitory storage media such as solid-state storage media, hard disk storage media, virtual storage media, cloud-based storage drives, storage servers, and/or the like.

The identify repository 136 may be a repository (e.g., a database) configured to intake, store, and manage PII data records. For instance, the identified data zone data engine 134 may split the raw data records into transaction data records and identity data records, and then store the identity data records in the identity repository 136. The identity data records may be stored separate from health data (e.g., transaction) to thereby not be PHI, and may be encrypted at rest. To do so, the identity repository 136 can be structured according to various database types, such as, relational, hierarchical, network, flat, point-in time, and/or object relational. In some embodiments, the identity repository 136 includes a plurality of nonvolatile/non-transitory storage media such as solid-state storage media, hard disk storage media, virtual storage media, cloud-based storage drives, storage servers, and/or the like.

The deidentified zone 137 includes a deidentified record repository 138, a data engine (e.g., the deidentified zone data engine 140), and a file repository 142. The deidentified zone data engine 140will be described further herein, but may include multiple other data engines, circuits, or controllers therein, to process and augment deidentified data records. For instance, the deidentified zone data engine 140 may retrieve or deidentified data records (e.g., deidentified PII data records, deidentified mapping data records, and transaction data records) from the identified zone 130 and store them in the deidentified record repository 138. Next, the deidentified zone data engine 140 augment each of the deidentified data records and generate files including the deidentified data records. The deidentified zone data engine 140 may then store the files in the file repository 142.

The deidentified record repository 138 may be a repository (e.g., a database) configured to receive, store, and manage deidentified data records (e.g., deidentified PII data records, deidentified mapping data records, transaction data records, etc.). In some embodiments, the deidentified zone 137 may include a separate repository for the deidentified PII data records, the deidentified mapping data records, and the transaction data records. Likewise, the deidentified record repository 138 can be structured according to various database types, such as, relational, hierarchical, network, flat, point-in time, and/or object relational. In some embodiments, the deidentified record repository 138 includes a plurality of nonvolatile/non-transitory storage media such as solid-state storage media, hard disk storage media, virtual storage media, cloud-based storage drives, storage servers, and/or the like.

The file repository 142 may be a repository (e.g., a database) configured to intake, store, and manage files generated by the deidentified zone data engine 140. To do so, the file repository 142 can be structured according to various database types, such as, relational, hierarchical, network, flat, point-in time, and/or object relational. In some embodiments, the file repository 142 includes a plurality of non-volatile/non-transitory storage media such as solid-state storage media, hard disk storage media, virtual storage media, cloud-based storage drives, storage servers, and/or the like.

Figure 2:
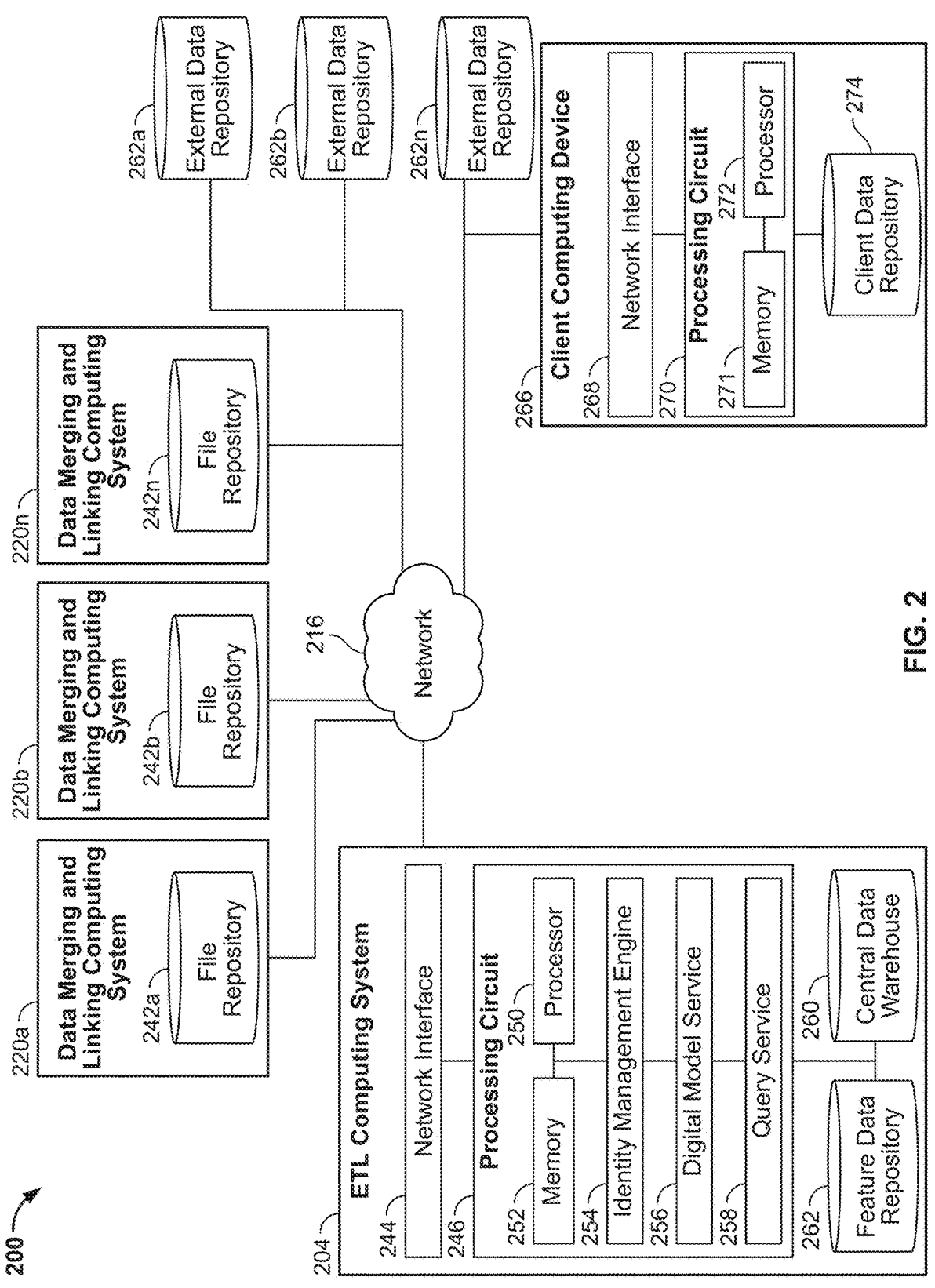
FIG. 2 is a component diagram of an ETL computing system, according to an example embodiment.

Referring now to FIG. 2, a, a system 200 for secure securely matching and querying data records is shown, according to an example embodiment. The system 200 includes an extract, transform, and load (ETL) computing system 204, multiple data merging and linking computing systems 220a-220n, multiple external data repositories 262a-262n, and a client computing device 266 connected by a secure network (e.g., the network 216).

The network 216 communicably and operably couples the (ETL) computing system 204, the multiple data merging and linking computing systems 220a-220n, the multiple external data repositories 262a-262n, and the client computing device 266 such that communicable and operable computing may be provided between each over the network 216. In various embodiments, the network 216 includes any combination of a local area network (LAN), an intranet, the Internet, or any other suitable communications network, directly or through another interface. In some embodiments, the network 216 is the internet, whereas the network 116 is a secure healthcare network (e.g., HIPAA network).

The (ETL) computing system 204 may provide for ETL and querying capabilities from the multiple data merging and linking computing systems 220a-220 and the multiple external data repositories 262a-262n, and operate on a data network (e.g., the network 218). Accordingly, the ETL computing system 204 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits).

In some embodiments, the ETL computing system 204 may act as a host and provide an application (e.g., a web-based application, a mobile application, etc.) to the client computing device 266 over the network 218 in response to authenticating the respective computing device. For example, the ETL computing system 204 may receive authentication data (e.g., a username and corresponding password, a limited-use key, a two-factor authentication code or key, etc.) from one of the client computing device 266. The ETL computing system 204 may then authenticate the client computing device 266 based on the authentication data and provide an application to the client computing device 266 over the network 216. In some examples, the ETL computing system 204 may be a multi-tenant system where various elements of hardware and software may be shared by one or more customers. In a multi-tenant system, a user is typically associated with a particular customer. In one example, a user (e.g., of the client computing device 266) could be an employee of one of a number of (pharmaceutical) companies which are tenants, or customers, of the provider computing system 104.

In some embodiments, the ETL computing system 204 may run on a cloud computing platform. Users can access content on the cloud independently by using a virtual machine image or purchasing access to a service maintained by a cloud repository provider.

In some embodiments, the ETL computing system 204 may be provided as Software as a Service ("SaaS") to allow users to access the ETL computing system 204 with a thin client.

As shown, the ETL computing system 204 may include a network interface 244, a processing circuit 246, a feature data repository 262, and a central data warehouse 260. In some embodiments, the provider computing system 104 may include an input/output circuit (e.g., similar to (e.g., the same as) an input/output circuit 162 as will described further herein).

The network interface 244 is structured to establish connections with the multiple data merging and linking computing systems 220a-220n, the multiple external data repositories 262a-262n, and the client computing device 204 by way of the network 216. The network interface 244 includes program logic and/or hardware-based components that connect the ETL computing system 204 to the network 216. For example, the network interface 244 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 244 includes the hardware and machine-readable media structured to support communication over multiple channels of data communication (e.g., wireless, Bluetooth®, near-field communication (NFC). In some embodiments, the network interface 244 includes cryptography logic and capabilities to establish a secure communications session.

The processing circuit 246, as shown, comprises a memory 250, a processor 252, an identity management service or engine 254, a digital model service 256, and a query service 258. The memory 250 includes one or more memory devices (e.g., RAM, NVRAM, ROM, flash memory, hard disk storage, etc.) that store data and/or computer code for facilitating the various processes described herein. That is, in operation and use, the memory 250 stores at least portions of instructions and data for execution by the processor 252 to control the processing circuit 246. The memory 250 may be or include tangible, non-transient volatile memory and/or non-volatile memory. The processor 252 may be implemented as a general-purpose processor, an application specific integrated circuit (ASIC), one or more field programmable gate array (FPGAs), a digital signal processor (DSP), a group of processing components or other suitable electronic processing components.

The identity management service 254 may be a computing service or circuit configured to match sets of external data with the deidentified identifies of the deidentified PII data records, as will be described further herein. For instance, the identity management service 254 may receive media exposure data. The identity management service 254 may then determine multiple deidentified PII data records that match the received media exposure data. In another example, the identity management service 254 may receive consumer data. The identity management service 254 may then determine multiple deidentified PII data records that match the received consumer data.

Still referring to FIG. 2, the digital model service 256 may be a computing service or circuit configured to select feature data records from the feature data repository 262 and one or more digital projection models (e.g., from a projection model database (not shown)) and determine one or more sets of values based on the data records described herein (e.g., feature data records, transaction data records, consumer data records, etc.). For instance, the digital model service 256 may select a first digital projection model and a first set of matching feature data records. The digital model service 256 may then determine one or more sets of values based on the data records described herein.

The query service 258 may be a computing service or circuit configured to receive a query (e.g., from the client computing device 266) and execute the query on the central data warehouse 260 to select multiple data records stored therein. For instance, the query service 258 may receive a query from the client computing device 266 including one or more query parameters or criterion and execute the query on the central data warehouse 260. In executing the query, the query service 258 may select and/or modify one or more data records. The data records may then be used to generate feature data sets, determine values, and/or to match with the deidentified PII data records.

The central data warehouse 260 may be a data warehouse including one or more repositories (e.g., databases) configured to intake, store, and manage data records from a variety of data sources (e.g., transaction data records, deidentified PII data records, consumer data records, media exposure data records, etc. In some embodiments, the data records may be matched with one another, as will be described further herein, and then stored in the central data warehouse 260 in association with one another. In some embodiments, the central data warehouse 260 may include a repository for each separate data record type (e.g., a repository for the transaction data records, a repository for the deidentified PII data records, and so on). In some embodiments, the central data warehouse may include a separate repository for each customer (e.g., a repository for customer 1, a repository for customer 2, etc.) to keep client data records separate. In some embodiments, the central data warehouse 260 may include a mapping file including the mapping or association between each of the matching data records. Accordingly, the repositories of the central data warehouse 260 can be structured according to various database types, such as, relational, hierarchical, network, flat, point-in time, and/or object relational. In some embodiments, the repositories of the central data warehouse 260 include a plurality of non-volatile/non-transitory storage media such as solid-state storage media, hard disk storage media, virtual storage media, cloud-based storage drives, storage servers, and/or the like.

The feature data repository 262 may be a repository (e.g., a database) configured to intake, store, and manage feature data records. The feature data records may be a subset of the data records that are described herein to be used for generating the digital models. For instance, the digital model service 256 may select the feature data records from a subset of the data records in the central data warehouse 260, and store the feature data records in the feature data repository 262. Accordingly, the feature data repository 262 can be structured according to various database types, such as, relational, hierarchical, network, flat, point-in time, and/or object relational. In some embodiments, the feature data repository 262 include a plurality of nonvolatile/non-transitory storage media such as solid-state storage media, hard disk storage media, virtual storage media, cloud-based storage drives, storage servers, and/or the like.

In some embodiments, the ETL computing system 204 may include a key repository (not shown) for the storage and management of access keys. The access keys may be generated by the ETL computing system 204 or the client computing device 266 and provision access to the repositories of the ETL computing system 204. For instance, to access the feature data of the feature data repository 262, the client computing device 266 or the ETL computing system 204 may provide an access key associated with the feature data repository 262. In some embodiments, the access keys may be changed or updated periodically (e.g., daily, weekly, monthly, etc.). In some embodiments, the access keys may be received with the data records. For instance, the ETL computing system 204 may receive media exposure data records from one of the external data repositories 262a-262n and an access key. The ETL computing system 204 may then store the data records in the central data warehouse 260 and secure the data records with the access key. Then, only in response to receiving a query or request including the access key may the ETL computing system 204 access the stored media exposure data records. For instance, the ETL computing system 204 may compare the received key with that of the key repository, and in response to verifying the received key (e.g., based on a match in the key repository) may access the stored data records.

Because the central data warehouse 260 may store data records (e.g., media exposure data records, transaction data records, etc.) associated with multiple customers, encryption of the data stored therein, and the use of the access keys may provide for improved data security and traceability. For instance, by securing customer data records stored in the central data warehouse 260 via an access key, the present systems and methods provide for additional security to access, modify, or retrieve customer data records, which provides for more secure storage of data records overall by preventing bad actors from retrieving. Likewise, by utilizing the access key to provision access to the data records of the central data warehouse 260, the present systems and methods provide for additional security by improving traceability of access to the data records. For instance, because each customer uses a unique access key, the ETL computing system 204 can determine which customer (and/or user) is requesting the customer's data records, thereby providing for improved security and traceability.

In some embodiments, the ETL computing system 204 and/or the central data warehouse may include a digital model repository (not shown). The digital model repository may be a repository that receives, stores, and manages various digital models (e.g., machine-learning (ML) models, statistical models, etc.) used to determine statistical values. To do so, the digital model repository can be structured according to various database types, such as, relational, hierarchical, network, flat, point-in time, and/or object relational. In operation, the digital model repository is configured to store, manage, and provide statistical values such as ML models (e.g., binary classification models, neural network models (e.g., Convolutional Neural Network (CNN) model, Long Short-Term Memory Networks (LSTMs) models) multiclass classification models, regression models (e.g., linear regression models), etc.).

The data merging and linking computing systems 220a-220n may each include a computer system (e.g., one or more servers each with one or more processing circuits) and be operated by, be managed by a "covered entity." In this regard, the data merging and linking computing system 120 may be an example of one of the data merging and linking computing systems 220a-220n. Moreover, the data merging and linking computing systems 220a-220n may be the same as the data merging and linking computing system 120 (and the description thereof may be applicable to the data merging and linking computing systems 220a-220n). For instance, whereas the system 100 may include the single data merging and linking computing system 120, the system 200 includes the multiple data merging and linking computing systems 220a-220n Each data merging and linking computing system 220a-220n may include a file repository (e.g., 242a-242n). In some embodiments, each data merging and linking computing system 220a-220n may further include a network interface (not shown), a processing circuit (not shown), an identified zone (not shown), and a deidentified zone (not shown).

Each file repository 242a-242n may be a repository (e.g., a database) configured to intake, store, and manage files as generated by the respective data merging and linking computing system 220a-220n. To do so, each file repository 242a-242n can be structured according to various database types, such as, relational, hierarchical, network, flat, point-in time, and/or object relational. In some embodiments, each file repository 242a-242n includes a plurality of nonvolatile/ non-transitory storage media such as solid-state storage media, hard disk storage media, virtual storage media, cloud-based storage drives, storage servers, and/or the like.

Still referring to FIG. 2, the client computing device 266 can be any type of computing device or computing system. For instance, the client computing device 266 can be one or more of a mobile phone, a tablet computer, a laptop computer, a smart watch, a server computer system, or any other internet-connected device. In operation, the client computing device 266 may communicate and interface with the ETL computing system 204 via the network 216 to generate and provide a query. As shown, the client computing device 266 may include a network interface 268, a processing circuit 270, and a client data repository 274.

The network interface 268 is structured to establish connections ETL computing system 204, the multiple data merging and linking computing systems 220a-220n, and the multiple external data repositories 262a-262n by way of the network 216. The network interface circuit 268 may include program logic and/or hardware-based components that connect the client computing device 266 to the network 216. For example, the network interface 268 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 268 includes the hardware and machine-readable media structured to support communication over multiple channels of data communication (e.g., wireless, Bluetooth®, near-field communication (NFC). In some embodiments, the network interface 268 includes cryptography logic and capabilities to establish a secure communications session.

The processing circuit 270, as shown, may comprise a memory 271 and a processor 272. The memory 271 includes one or more memory devices (e.g., RAM, NVRAM, ROM, flash memory, hard disk storage, etc.) that store data and/or computer code for facilitating the various processes described herein. That is, in operation and use, the memory 271 stores at least portions of instructions and data for execution by the processor 272 to control the processing circuit 270. The memory 271 may be or include tangible, non-transient volatile memory and/or non-volatile memory. The processor 272 may be implemented as a general-purpose processor, an application specific integrated circuit (ASIC), one or more field programmable gate array (FPGAs), a digital signal processor (DSP), a group of processing components or other suitable electronic processing components.

The client data repository 274 may be a repository (e.g., a database) configured to intake, store, and manage data records of the client (referred to as client data records). The client data records may be provided to the ETL computing system 204 as a part of a query, and used for matching with data records of the central data warehouse 260. Accordingly, the client data repository 274 can be structured according to various database types, such as, relational, hierarchical, network, flat, point-in time, and/or object relational. In some embodiments, the client data repository 274 include a plurality of nonvolatile/non-transitory storage media such as solid-state storage media, hard disk storage media, virtual storage media, cloud-based storage drives, storage servers, and/or the like.

The external data repositories 262a-262n may each be a repository (e.g., a database) configured to intake, store, and manage a specific type of data record (e.g., media exposure data records, consumer data records, health care provider (HCP) data records, etc.). The external data repositories 262a-262n may each be operated and managed by a data provider and include the specific type of data records therein. Accordingly, each external data repository 262a-262n can be structured according to various database types, such as, relational, hierarchical, network, flat, point-in time, and/or object relational. In some embodiments, each external data repository 262a-262n includes a plurality of non-volatile/non-transitory storage media such as solid-state storage media, hard disk storage media, virtual storage media, cloud-based storage drives, storage servers, and/or the like.

For instance, one of the external data repositories 262a-262n may be a consumer repository that receives, stores, and manages various consumer information associated with multiple consumers. In operation, the consumer repository is configured to store consumer information such as IP addresses of consumers who watched a video, IP addresses of consumers who visited a specific webpage, names of consumers who live within a specific state, consumer demographic information (e.g., income information, gender information, ethnicity information), and the like.

Likewise, one of the external data repositories 262a-262n may be an HCP repository that receives, stores, and manages various HCP information associated with multiple HCPs and/or NPIs. In operation, the HCP repository is configured to store HCP information such as HCP address or other HCP location information (e.g., address of the HCP's employer, zip code of the HCP or the HCP's employer, etc.), HCP NPI, Veeva HCP Identifier (VID), HCP specialties, HCP type (e.g., Nurse Practitioner, Doctor of Medicine, etc.), and the like.

Figure 3B:
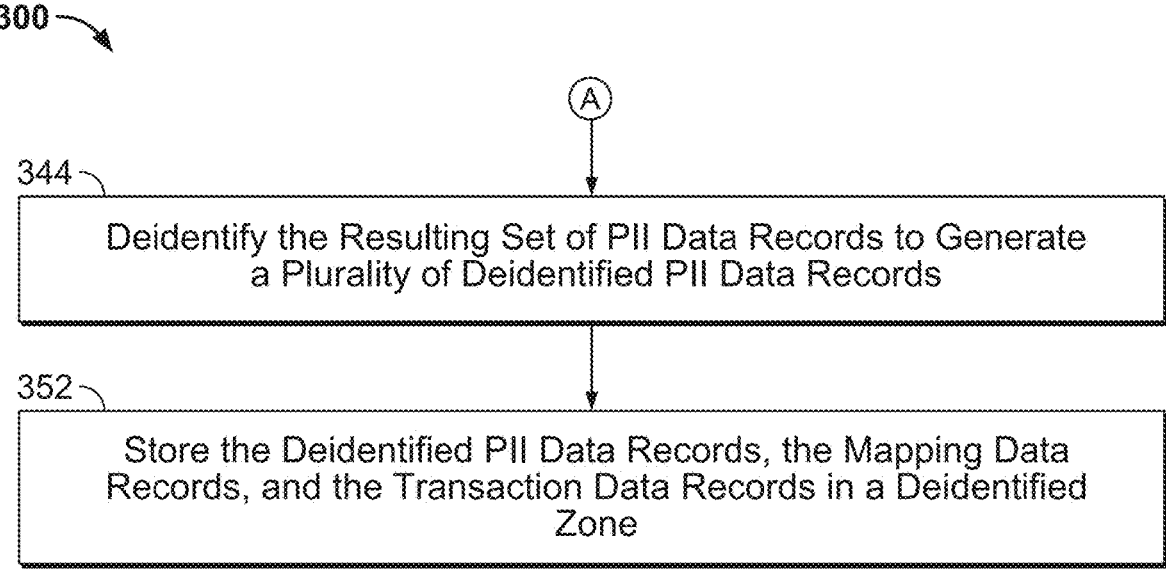

Referring now to FIGS. 3A-3B, a method 300 of processing raw data records to generate deidentified personally identifiable (PII) data records and transaction data records is shown, according to an example embodiment. Method 300 can be carried out by the system of FIG. 1. More particularly, the method 300 can be carried out by the data merging and linking system 120 of FIG. 1 and through communication with the data supplier computing systems 106a-106n. Moreover, method 300 may be carried out in the identified domain 130 of the data merging and linking system 120 such that the steps of the method 300 may take place in the domain including the PHI, PII, and other identifying data that is not introduced in the deidentified domain 137. In this regard, it should be understood that each of the steps of the method 300 may take place in the identified domain 130, except step 352, which may take place in the deidentified domain 137.

Method 300 commences at step 304 at which the data merging and linking system 120 receives multiple data records. For instance, at step 304, the data merging and linking system 120 may receive data records from each of the data supplier computing systems 106a-106n. In some embodiments, the data merging and linking system 120 may retrieve the data records from the data supplier computing systems 106a-106n. For instance, the data merging and linking system 120 may generate a request for the data records, output the request to each of the data supplier computing systems 106a-106n, and receive the data records in response.

In some embodiments, data records may be received on a rolling basis. For instance, the data merging and linking system 120 may receive a first set of data records from one of the data supplier computing systems 106a-106n at a first time. Then, at a second, later time, the data merging and linking system 120 may receive a second set of data records from one of the data supplier computing systems 106a-106n. In other embodiments, the data merging and linking system 120 may receive the data records on a specific repetitive timeframe (e.g., weekly, monthly, daily, etc.).

Once the data merging and linking system 120 has received the data records, the method 300 proceeds to step 308 at which the data merging and linking system 120 modifies, splits, or separates the data records to generate personally identifiable information (PII) data records and transaction data records. The PII data records may be data records that include the PII fields or data of the raw data records such as the name of the patient, the date of birth of the patient, insurance data, contact information of the patient (e.g., phone number, address, etc.), a social security or government number, and the like. In comparison, the transaction data records may include the prescription or transaction fields or data of the raw data records such as the date of the transaction, health care provider (HCP) data (e.g., NPI, HCP name, HCP contact information, HCP specialty, etc.) of the prescribing HCP, the cost of the transaction, the prescribing pharmacy address, the pharmacy type (e.g., specialty pharmacy, hospital pharmacy, online pharmacy, etc.), and the like.

In some embodiments, at step 308, the data merging and linking system 120 may select and update a frequency table or file (e.g., from a frequency file repository (not shown)). The frequency table or file will be described further herein but may provide an indication of the frequency of which certain fields or keys appear in the PII. For instance, the frequency file may include specific fields of the PII data records, and indicate whether a specific field is frequent or common. In one example, the name "john" may be a frequent name, and thus reflected with a higher percentage on the frequency table. In this regard, when generating the PII data records, the data merging and linking system 120 may update the frequency table to reflect the newly received PII values, and their corresponding frequency against all received PII values.

In some embodiments, the data merging and linking system 120 may generate a transaction data record and a PII data record for each raw data record. For instance, the data merging and linking system 120 may receive 5 raw data records, and generate 5 PII data records and 5 transaction data records at step 308. In other embodiments, the data merging and linking system 120 may generate only PII data records which are not duplicative. For instance, the data merging and linking system 120 may receive five raw data records, but two of the data records may be for the same patient (e.g., John Smith) and two separate transactions (e.g., for medical product A and for medical product B). Accordingly, at step 308, the provider computing system 104 may generate five transaction data records, but only four PII data records (to remove the duplicative patient).

Once the data merging and linking system 120 has modified the data records to generate multiple PII data records and transaction data records, the method 300 proceeds to step 312 at which the data merging and linking system 120 links the PII data records with the transaction data records to generate a plurality of mapping data records. In some embodiments, step 312 may take a place as a part of step 308. For instance, each time the data merging and linking system 120 splits a raw data record into a PII data record and a transaction data record, the data merging and linking system 120 may generate a mapping data record linking the two.

For example, the data merging and linking system 120 may split a raw data record into a first transaction data record including a first UID and a first PII data record including a second UID, and the data merging and linking system 120 may then generate a mapping data record including the first UID and the second UID, thereby indicating the first transaction data record and the first PII data record are linked. In some embodiments, each mapping data record may include a link (e.g., a reference pointer, a hyperlink, a uniform resource locator (URL), etc.) to each of the linked data records (e.g., the first transaction data record and the first PII data record). In some embodiments, each mapping data record may further include a link to the original raw data record.

In other embodiments, at step 312, the data merging and linking system 120 may generate and populate a mapping file. The mapping file may include a row or value for each mapping data record. For instance, the data merging and linking system 120 may split five raw data records into five PII data records and five transaction data records. Accordingly, the data merging and linking system 120 may generate a mapping file including five rows. One for each mapping or link between the PII data records and the transaction data records. In some embodiments, the mapping file may be a spreadsheet file including a row for each link.

Once the data merging and linking system 120 has generated the mapping data records, the method 300 proceeds to step 316 at which the data merging and linking system 120 normalizes the transaction data records. In some embodiments, the data merging and linking system 120 may normalize the transaction data records by removing or deidentifying remaining PII such as the insurance information (e.g., insurance number, group number, etc.).

In some embodiments, the data merging and linking system 120 may normalize the transaction data records by cleaning and standardizing the transaction data records. For instance, the data merging and linking system 120 may normalize the transaction data records by removing duplicate or substantially duplicate values (e.g., zip-3 code and zip-5 code), change missing or null values; standardize specific formats, and correct or remove outlier data. For instance, to modify the missing values the data merging and linking system 120 may remove rows with missing values or fill in missing values with other values (e.g., "0"). Likewise, to standardize formats, the data merging and linking system 120 may convert various date formats (e.g., "12/25/2025" "Dec. 25, 2025") to a single standard format (e.g., YYYY-MM-DD), standardize text case ("john smith" vs. "John Smith"), and correct spelling or naming inconsistencies ("Calif" vs. "California").

In some embodiments, at step 316, the data merging and linking system 120 may modify the transaction data records to fit or change the transaction data records to match a transaction data record schema. The transaction data record schema may define specific fields, data types, data objects, and/or relationships between the fields and data objects. In this regard, the data merging and linking system 120 may modify the transaction data records such that each matches or fits the transaction data record schema.

Once the data merging and linking system 120 has normalized the transaction records, the method 300 proceeds to step 320 at which the data merging and linking system 120 normalizes the PII data records. Normalizing the PII data values may be the same as or similar to step 316. For instance, the data merging and linking system 120 by cleaning and standardizing the transaction data records. For instance, the data merging and linking system 120 may normalize the PII data records by removing duplicate or substantially duplicate values (e.g., zip-3 code and zip-5 code), change missing or null values; standardize specific formats, and correct or remove outlier data. For instance, to modify the missing values, the data merging and linking system 120 may remove rows with missing values or fill in missing values with other values (e.g., "0"). Likewise, to standardize formats, the data merging and linking system 120 may convert various date formats (e.g., "12/25/2025" "Dec. 25, 2025") to a single standard format (e.g., YYYY-MM-DD), standardize text case ("john smith" vs. "John Smith"), and correct spelling or naming inconsistencies ("Calif" vs. "California").

In some embodiments, at step 320, the data merging and linking system 120 may modify the transaction data records to fit or change the PII data records to match a PII data record schema. The PII data record schema may define specific fields, data types, data objects, and/or relationships between the fields and data objects. In this regard, the data merging and linking system 120 may modify the PII data records such that each matches or fits the PII data record schema.

Once the data merging and linking system 120 has normalized the PII data records, the method 300 proceeds to step 324 at which the data merging and linking system 120 generates at least one PII key for each PII data record. The PII keys may be fields of the PII data record that are combined to create a single value or key, and for which a match between two data records is indicative of a match in patient or identifications. For instance, one key may be the social security number (e.g., 11-111-1111) and the name of the patient of the PII data record (e.g., John) combined. Accordingly, the key may be both value combined or concatenated (e.g., 11-111-1111+John or 111111111John). Another, key may be the social security number and the date of birth of the patient of the PII data record combined (e.g., 11-111-1111+12/07/1995 or 11111111112071995). In this regard, at step 324, the data merging and linking system 120 may generate multiple keys for each PII data record, where each key is a combination of one or more of the fields of the of the PII data record. For instance, the PII data record may include 6 fields, and the data merging and linking system 120 may generate up to 720 keys (e.g., any combination of the 6 fields or 6!=720).

In some embodiments, the data merging and linking system 120 may determine which specific key to use to match the PII data records based on a frequency score of a frequency table or file. The frequency table may include specific commonly occurring PII fields, and reflect each with a percentage or value (the frequency score) indicating the frequency or lack of uniqueness for the field. In this regard, at step 324 the data merging and linking system 120 may determine the frequency score for each field of the PII data record, and then select the key which corresponds with the lowest frequency score overall (e.g., the sum of the frequency score for each key included therein). For instance, the data merging and linking system 120 may generate a key for a first PII data record including a first name with a high frequency score (e.g., John), last name with a high frequency score (e.g., Smith), a date of birth with a high frequency score (e.g., 01/01/1995), a social security number with a low frequency score (e.g., 11-123-1234), and an insurance or cardholder ID with a low frequency score (e.g., 111111111). Accordingly, the data merging and linking system 120 may determine a frequency score for each key (e.g., first name+ social security number, last name+social security number, date of birth+social security number, etc.).

In some embodiments, the frequency score of a key is equivalent to the frequency score of each of the fields of the key divided by the number of features in the key. For instance, a specific key may include three fields (e.g., first name, last name, and social security number), and each field may be assigned a specific frequency score (e.g., 0, 0, 10). Accordingly, the frequency score of the key including each of the fields may be equivalent to the frequency score of each of the fields of the key (0+0+10=10) divided by the number of features in the key (3). In that regard, the frequency score would be 3.333 (e.g., 10/3). By generating the frequency score of the key based on the frequency score of the features and the number of features included in the key, the frequency score better represents each of the features included therein, and the likelihood of a match based on the number of features. For instance, if a key has greater than a threshold frequency score, it may be deleted or marked as too frequent to be matched on.

By utilizing a frequency score, the present systems and methods provide for a technical improvement to matching algorithms and data deduplication techniques by utilizing keys that are likely to result in a unique match and not return a false positive. For instance, because the present systems and methods calculate a frequency score associated each field and/or key and then eliminate or strike certain keys based on the frequency scores, the present systems and methods do not attempt to perform matches on keys that are likely to return false positives, thereby using less processing power to perform matches that will return false positives and not actually show a true match. For instance, matching on high-frequency keys generates a massive number of potential record pairs for comparison by the present system. Accordingly, by striking these common keys, the present system spends less time processing and comparing millions of pairs that are likely to be incorrect. This prunes the search space of potential matches, leading to a substantial increase in algorithmic efficiency and a reduction in processing time and power. Likewise, because the keys may be deleted and not saved based on a high frequency score, the present systems and methods use less memory to store keys that will potentially result in false matches.

Moreover, by proactively striking specific, overly frequent matching keys (like common names or generic terms) to avoid false matches, the present systems provide for improved precision and a reduction in false positives within data linkage and entity resolution systems. For instance, highly frequent keys (high-frequency keys), such as common last names ("Smith," "Lee") or generic address elements ("Main Street," "Avenue"), have a low discriminative power. Matching on these keys alone often results in linking records that belong to different entities (false positives). Accordingly, by striking or down-weighting these keys and forcing the system to rely on less frequent, more unique combinations of keys (e.g., date of birth+rare middle name+specific ZIP code), the process ensures that matches are based on stronger, less ambiguous evidence which directly increases the precision of the match results.

Once the data merging and linking system 120 has generated the keys for each of the PII data records, the method 328 at which the data merging and linking system 120 matches the keys amongst one another. For instance, at step 324, the data merging and linking system 120 may generate 120 keys for 120 PII data records. Then, the data merging and linking system 120 may match the 120 keys amongst one another (e.g., determine the first key matches the $30^{th}$ key, the seventh key matches the $18^{th}$ key and the $100^{th}$ key, and so on). In this regard, the data merging and linking system 120 may determine a first key of the multiple keys matches a second key or a third key of the multiple keys. In some embodiments, at step 328, the data merging and linking system 120 may determine exact matches amongst the keys (e.g., the first key is exactly the same as the fifth key, and so on).

In some embodiments, where each PII data record has multiple keys (e.g., a first key with a first type (i.e., set of fields included therein), a second key with a second type, a third key with a third type, and so on), the data merging and linking system 120 may match keys of the same type (e.g., keys with the first type are matched with other keys with the first type, keys with the second type are matched with other keys with the second type, and so on) to prevent fruitless matching of keys with different types that will not match whatsoever.

Once the data merging and linking system 120 has matched the keys, the method 300 proceeds to step 332 at which the data merging and linking system 120 merges or combines multiple PII data records based on the matched PII keys. For instance, at step 328, the data merging and linking system 120 may match the keys amongst one another (e.g., determine the first key matches the $30^{th}$ key, the seventh key matches the $18^{th}$ key and the $100^{th}$ key, and so on). Accordingly, at step 328, the data merging and linking system 120 may modify the PII data records associated with the matched keys to merge the PII data records. For instance, using the example above, the data merging and linking system 120 may merge or combine the first PII data record associated with the first key with the $30^{th}$ PII data record associated with the $30^{th}$ key (based on their match).

To merge the PII data records, the data merging and linking system 120 may determine each field of the merged PII data record based on the PII data records being merged. For instance, if either data record is missing a specific field or has an empty/null value in the field, the data merging and linking system 120 may populate the field of the merged PII data record based on the PII data record which has a value stored therein. If both PII data records being merged have a specific field that is not the same (and also not null or empty), the data merging and linking system 120 may select the field with the lower frequency score and populate the merged PII data record with the selected field.

In some embodiments, prior to step 332, the data merging and linking system 120 may generate a score or value based on each set of matches. For instance, the data merging and linking system 120 may determine a first key, a second key, and a third key of the first PII data record matches a fourth key, a fifth key, and a sixth key of the second PII data record. Accordingly, the data merging and linking system 120 may generate a score associated with the matching PII data records by determining points associated with each matching set of keys and summing the scores (e.g., a specific number of points for the first match (e.g., 50), a specific number of points for the second keys matching (e.g., 10 points), and a specific number of points for the third keys matching (e.g., 50 points) which is a score of 110). In some embodiments, the number of points for each key may be received by the data merging and linking system 120 and reflect the complexity of the matching keys (e.g., 50 points may reflect a complicated match including multiple fields, whereas 10 points may reflect a simple match including a single field). In some embodiments, if the matching keys have a frequency score greater than a threshold value, the data merging and linking system 120 may determine no score for the specific matching keys.

Then, based on the score, the data merging and linking system 120 may merge the PII data records. For instance, based on the score being greater than a threshold score (e.g., 50 points, 100 points, etc.), the data merging and linking system 120 may merge the PII data records. In comparison, if the data records are less than the threshold score (e.g., 100 points), the data merging and linking system 120 may not merge the PII data records. In some embodiments, there might be two threshold scores (e.g., a first threshold score and a second threshold score). The first threshold score (e.g., 100) might indicate a match, whereas the second threshold score (e.g., 50, which is less than the first threshold score) might indicate a fuzzy match is to be performed (and the data merging and linking system 120 may flag the PII data record as requiring a fuzzy match), as will be described further herein.

In some embodiments, while matching and merging the PII data records, the data merging and linking system 120 may generate an indication or link amongst the merged PII data records. For instance, at step 332, the data merging and linking system 120 may update the mapping file to indicate which data records are now linked. For instance, as described herein, the mapping file may include a UID of linked PII data record and the linked transaction data record. Accordingly, the data merging and linking system 120 may update the mapping file to indicate PII data records which are merged. In some embodiments, the data merging and linking system 120 may overwrite at least one of the PII data records UID in the mapping file (e.g., replace all UIDs of the first PII data record with the UID of the second PII data record).

Steps 328 and 332 may be repeated until each matching key is determined and the associated PII data records are combined. Likewise, in some embodiments, after step 328 and 332 (and matching and merging each data record of the new batch), the data merging and linking system 120 may retrieve stored PII data records (e.g., from the identity repository 136). For instance, the data merging and linking system 120 may retrieve PII data records stored in the identity repository 136 and then match the keys as described herein. The data merging and linking system 120 may then merge the PII data records associated with the matched keys, as described herein.

In some embodiments, after steps 332 (and all merging is complete), the data merging and linking system 120 may determine a set of PII data records or keys that include a fuzzy match flag and perform a fuzzy match on the corresponding set of keys. Fuzzy matching, or approximate matching, is a process used to find text values (e.g., data records) or text strings that are similar but not identical. Unlike exact matching, which requires a perfect match, fuzzy matching accounts for variations like typos, misspellings, or abbreviations. In this regard, the data merging and linking system 120 may match the data records of the flagged set of PII records based on a fuzzy matching algorithm. The fuzzy matching algorithm may calculate a distance or similarity score between the two strings. A lower distance or higher score indicates a closer match. For instance, the data merging and linking system 120 may use at least one of a Levenshtein distance algorithm, the Damerau-Levenshtein distance algorithm, the Jaro-Winkler distance algorithm, the Jaro similarity algorithm, or the prefix boost algorithm. After matching the keys using fuzzy matching, the data merging and linking system 120 may merge the matching PII data records.

In an illustrative example, the data merging and linking system 120 may generate 120 keys for 120 PII data records, and then proceed to match the 120 keys amongst one another. Then, at step 332, the data merging and linking system 120 may merge the matched PII data records, which results in a final set 72 PII data records. Next, the data merging and linking system 120 may select 25,000 PII data records from the identity repository 136 and match the 25,000 PII data records with the 72 PII data records, which results in a total set of 25,046 PII data records. The data merging and linking system 120 may then perform a fuzzy match on the flagged PII data records (e.g., 25 PII data records), which results in a set of 13 PII data records, and which are again combined with the 25,021 PII data records. For each merged data record, the data merging and linking system 120 may then update the mapping file to indicate the merge.

In another illustrative example, the data merging and linking system 120 may generate 480 keys for 120 PII data records (4 keys for each PII data record,), and then proceed to match the 120 keys of the first type amongst one another, the 120 keys of the second type amongst one another, the 120 keys of the third type amongst one another, and so on. Then, the data merging and linking system 120 may generate a score associated with each PII data record based on the matching keys. If the score is greater than a specific threshold value, the data merging and linking system 120 may merge the matched PII data records, which results in a final set 72 PII data records. Next, the data merging and linking system 120 may select 25,000 PII data records from the identity repository 136 and match the 25,000 PII data records with the 72 PII data records, which results in a total set of 25,046 PII data records. For each merged data record, the data merging and linking system 120 may then update the mapping file to indicate the merge.

Once the data merging and linking system 120 has merged two or more of the PII data records, the method 300 proceeds to step 340 at which the data merging and linking system 120 stores the resulting PII data records in the identity repository 136. For instance, using the example directly above, the data merging and linking system 120 may store the total set of 25,046 PII data records in the identity repository 136. In some embodiments, only PII data records which are new or have been modified (e.g., merged with another data record) are updated in the identity repository 136.

Once the data merging and linking system 120 has stored the PII data records in the identity repository 136, the method 300 proceeds to step 344 at which the data merging and linking system 120 deidentifies the resulting (or new) PII data records to generate multiple deidentified PII data record. For instance, for each PII data record which has not previously been deidentified (i.e., is new or was merged), the data merging and linking system 120 may deidentify the PII data record by encrypting the fields of the PII data record, tokenizing the fields of the PII data record, or by performing some other information masking function.

In other embodiments, the data merging and linking system 120 may deidentify the PII data record by performing a hash function on the fields of the PII data record. For example, the data merging and linking system 120 may perform a hash function on the fields of the PII data record that removes the identity or private information of the patient and returns a hash value in place of the field. Example hash functions include, but are not limited to, the mid-square method, string folding, and the like. In some embodiments, all data merging and link computing systems (e.g., 220a-220n) may use the same hash function to provide for consistent hash values.

In some embodiments, the data merging and linking system 120 may generate a token based on the PII data record (e.g., the fields of the PII data record) and replace the PII of the PII data record with the token to generate the deidentified PII data record. In some embodiments, the data merging and linking system 120 may provide each PII data record to a token generation computing system (not shown), which may generate and add the token to each data record. In other embodiments, the token generation computing system may return the token for each PII data record, which may then be added to the PII data record. In other embodiments, the data merging and linking system 120 may generate the token by generating a random value, storing the PII in the identity repository 136, and the token in a token repository (not shown).

In some embodiments, the token is a Secure Multiparty Computation (SMC) token generated based on the PII data record and add the SMC token to the deidentified PII data record. SMC is a cryptographic technique that enables multiple parties to compute a function over their private inputs without revealing individual inputs to each other. This is achieved through secure protocols that ensure the integrity and confidentiality of the data throughout the computation process. Essentially, SMC allows for collaborative computations without compromising data privacy. For example, parties can collaborate on deidentified data records without sharing identity information or PHI. In one example, the SMC token may be a garbled circuit protocol token. The SMC token is still deidentified but provides for matching between the transaction data records and the PII data records without identifying the PII of any of the data records.

Once the data merging and linking system 120 has deidentified the PII data records and generated deidentified PII data records, the method 352 proceeds to step 352 at which the data merging and linking system 120 stores the deidentified PII data records, the mapping data records, and the transaction data records in the deidentified record repository 138 of the deidentified domain 137. In some embodiments, at or after step 352, the data merging and linking system 120 may generate one or more files (e.g., a deidentified PII file, a transaction file, and the mapping file) and store the files in the file repository 142. The files may be one or more file types (e.g., document file, spreadsheet file, XML file, PDF file, etc.) and include the corresponding data records therein.

Referring now to FIG. 4 a method 400 of extracting data records from files and storing the data records is shown, according to an example embodiment. While different overall, it should be understood that any steps or discussion of the method 300, 500, 600, 700, and 800 may be applied or included within the method 400, and vice versa, and that such combinations are included within the scope of the present disclosure. For example, the method 300 may include any of the steps 404-424, 504-520, 604-620, 704-716, or 804-824, after or before any steps included in the method 300; the method 400 may include any of the steps 304-352, 504-520, 604-620, 704-716, or 804-824, after or before any of the steps included in the method 400; the method 500 may include any of the steps 304-352,404-424, 604-620, 704-716, or 804-824, after or before any of the steps included in the method 500; the method 600 may include any of the steps 304-352,404-424, 504-520, 704-716, or 804-824, after or before any of the steps included in the method 600; the method 700 may include any of the steps 304-352,404-424, 504-520, 604-620, or 804-824, after or before any of the steps included in the method 700, and the method 800 may include any of the steps 304-352,404-424, 504-520, 604-620, or 704-716, after or before any of the steps included in the method 800.

Method 400 can be carried out by the system of FIG. 2. More particularly, the method 400 can be carried out by the ETL computing system 204 of FIG. 1 and through communication with the data merging and linking computing systems 220a-220n, the external data repositories 262a-262n, and the client computing device 266.

Method 400 commences at step 404 at which the ETL computing system 204 receives a transaction file. In some embodiments, the transaction file may be received or retrieved from one of the data merging and linking computing systems 220a-220n. In some embodiments at step 404, the ETL computing system 204 may receive multiple transaction files (e.g., one from each data merging and linking computing system 220a-220n).

Once the ETL computing system 204 has received the transaction file, the method 400 proceeds to step 408 at which the ETL computing system 204 extracts or determines multiple transaction data records based on the transaction file. As described herein, each transaction file may include or represent multiple transaction data records. Accordingly, at step 408, the ETL computing system 204 may extract the transaction data records from the transaction data file. In some embodiments, the ETL computing system 204 may extract transaction data records from multiple transaction files. In some embodiments, at step 404, the ETL computing system 204 receives transaction data records (and step 408 is skipped).

Once the ETL computing system 204 has extracted the transaction data records, the method 400 proceeds to step 412 at which the ETL computing system 204 stores the transaction data records in the central data warehouse 260. For instance, the ETL computing system 204 may add each of the transaction data records to a transaction data record section or repository of the central data warehouse 260.

Once the ETL computing system 204 has stored the transaction data records in the central data warehouse, the method 400 proceeds to step 420 at which the ETL computing system 204 receives a deidentified PII file. In some embodiments, the deidentified PII file may be received or retrieved from one of the data merging and linking computing systems 220a-220n. In some embodiments at step 420, the ETL computing system 204 may receive multiple deidentified PII files (e.g., one from each data merging and linking computing system 220a-220n).

Once the ETL computing system 204 has received the deidentified PII file, the method 400 proceeds to step 420 at which the ETL computing system 204 extracts or determines multiple deidentified PII data records based on the deidentified PII file. As described herein, each deidentified PII file may include or represent multiple deidentified PII data records. Accordingly, at step 420, the ETL computing system 204 may extract the deidentified PII data records from the deidentified PII file. In some embodiments, the ETL computing system 204 may extract deidentified PII data records from multiple deidentified PII files. In some embodiments, at step 416, the ETL computing system 204 receives deidentified PII data records (and step 420 is skipped).

Once the ETL computing system 204 has extracted the deidentified PII data records, the method 400 proceeds to step 424 at which the ETL computing system 204 stores the deidentified PII data records in the central data warehouse 260. For instance, the ETL computing system 204 may add each of the deidentified PII data records to a deidentified PII data record section or repository of the central data warehouse 260.

In some embodiments, after step 424, the ETL computing system 204 may receive one or more mapping files (e.g., from the data linking and merging computing systems 242a-242n). In some embodiments, the ETL computing system 204 extracts mapping records from the mapping files and stores the mapping records in the central data warehouse 260. In other embodiments, the ETL computing system 204 stores the mapping file(s) in the central data warehouse 260.

Figure 5:
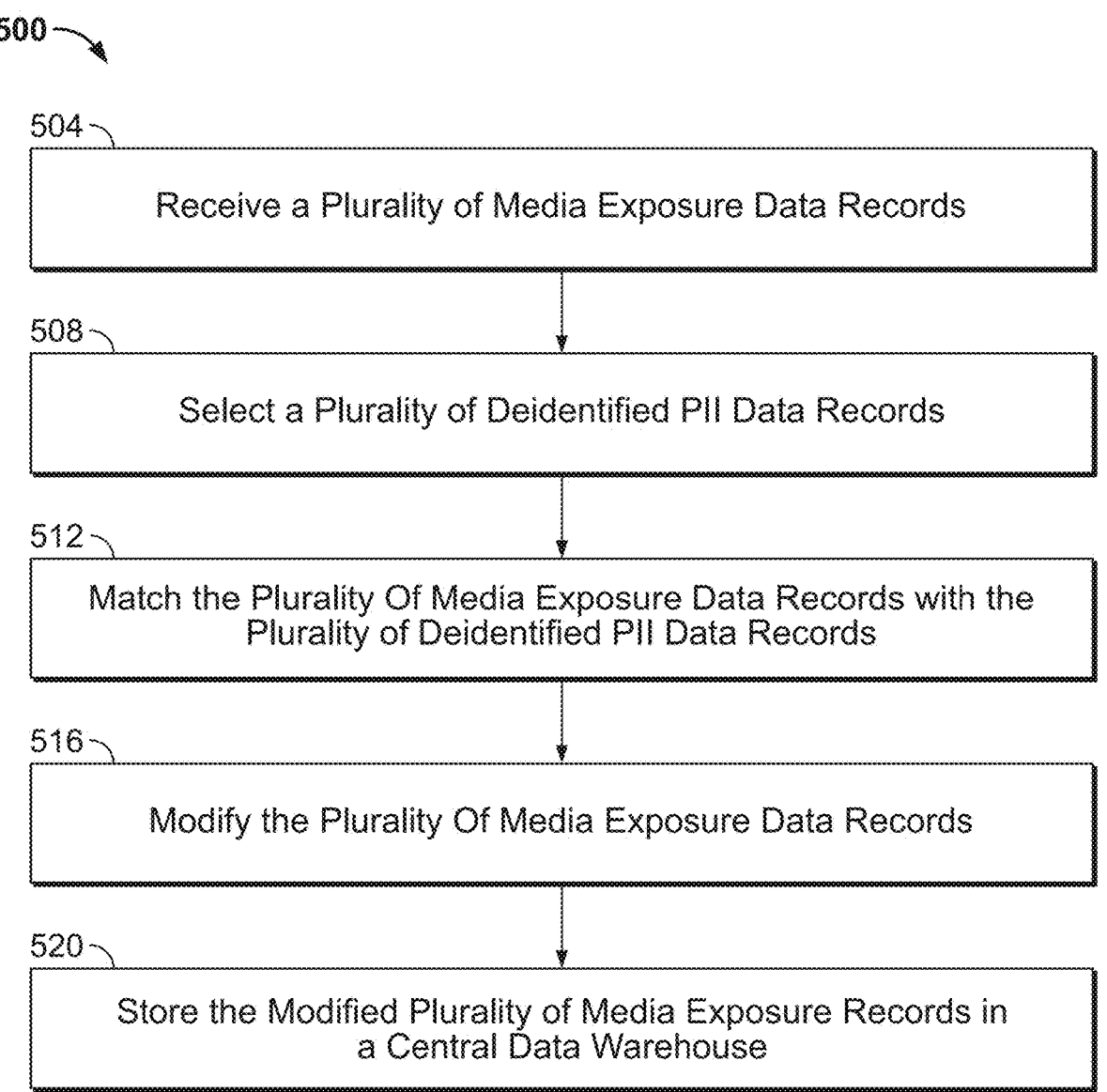
FIG. 5 is a flow diagram of a method for matching media exposure data records with deidentified PII data records, according to an example embodiment.

Referring now to FIG. 5, a method 500 of tagging media exposure data records with deidentified PII data records is shown, according to an example embodiment. Method 500 can be carried out by the system of FIG. 2. More particularly, the method 500 can be carried out by the ETL computing system 204 of FIG. 1 and through communication with the data merging and linking computing systems 220a-220n, the external data repositories 262a-262n, and the client computing device 266.

Method 500 commences at step 504 at which the ETL computing system 204 receives multiple consumer data records. The consumer data records may be received from one or more of the external data repositories or sources 262a-262n and include consumer demographics such as identifying information (e.g., name, date of birth, address), consumer income information, gender information, ethnicity information, age information, and the like. In some embodiments, the consumer data records may be received from an external data repository (e.g., 262a) operated by a consumer data management company.

In some embodiments, the received consumer data records include a token (e.g., an SMC token). In some embodiments, after step 504, the ETL computing system 204 may generate a token for each consumer data record and add the token to the consumer data record. In other embodiments, the ETL computing system 204 may provide each consumer data record to a token generation computing system (not shown), which may generate and add the token to each consumer data record. In other embodiments, the token generation computing system may return the token for each consumer data record, which may then be added to the consumer data record.

Once the ETL computing system 204 has received the consumer data records, the method 500 proceeds to step 508 at which the ETL computing system 204 selects or determines multiple deidentified PII data records from the central data warehouse 260. In some embodiments, prior to step 508, the ETL computing system 204 may receive or retrieve the deidentified PII file(s) (as discussed with regard to the method 400).

Once the ETL computing system 204 has selected or determined the PII data records, the method 500 proceeds to step 512 at which the ETL computing system 204 matches the consumer data records with the deidentified PII data records. In some embodiments, the ETL computing system 204 may match the consumer data records and PII data records based on matching tokens. For instance, the ETL computing system 204 may determine a first deidentified PII data record matches a first consumer record based on both data records including the same token. In some embodiments, the ETL computing system 204 may match the consumer data records and PII data records based on other fields of each record (e.g., date of birth, address, etc.).

Once the ETL computing system 204 has matched the consumer data records with the deidentified PII data records, the method 500 may proceed to step 516 at which the ETL computing system 204 modifies one or more of the consumer records based on the matches of step 512. For instance, the ETL computing system 204 may modify each matched consumer data record to tag the consumer data record with the identifier (e.g., UID) of the deidentified PII data record. In one example, the ETL computing system 204 may modify the matched consumer data record to include the identifier of the matched deidentified PII data record. In other embodiments, the ETL computing system 204 may modify each matched consumer data record to include a link (e.g., a reference pointer, a uniform resource locator (URL), a hyperlink, etc.) to the matched deidentified PII data record.

In some embodiments, at step 516, the ETL computing system 204 may modify each matched deidentified PHI data record. For instance, the ETL computing system 204 may modify the deidentified PHI data record to tag the deidentified PII data record with the identifier (e.g., UID of the matched consumer data record. In other embodiments, the ETL computing system 204 may modify each matched deidentified PII data record to include a link (e.g., a reference pointer, a uniform resource locator (URL), a hyperlink, etc.) to the matched consumer data record.

Once the ETL computing system 204 has modified the matched consumer data records, the method 500 proceeds to step 520 at which the ETL computing system 204 stores the modified consumer data records in the central data warehouse 260. For instance, the ETL computing system 204 may add each of the modified consumer data records to the central data warehouse 260 and discard each non-modified consumer data record (e.g., the consumer data records where there was no match).

Figure 6:
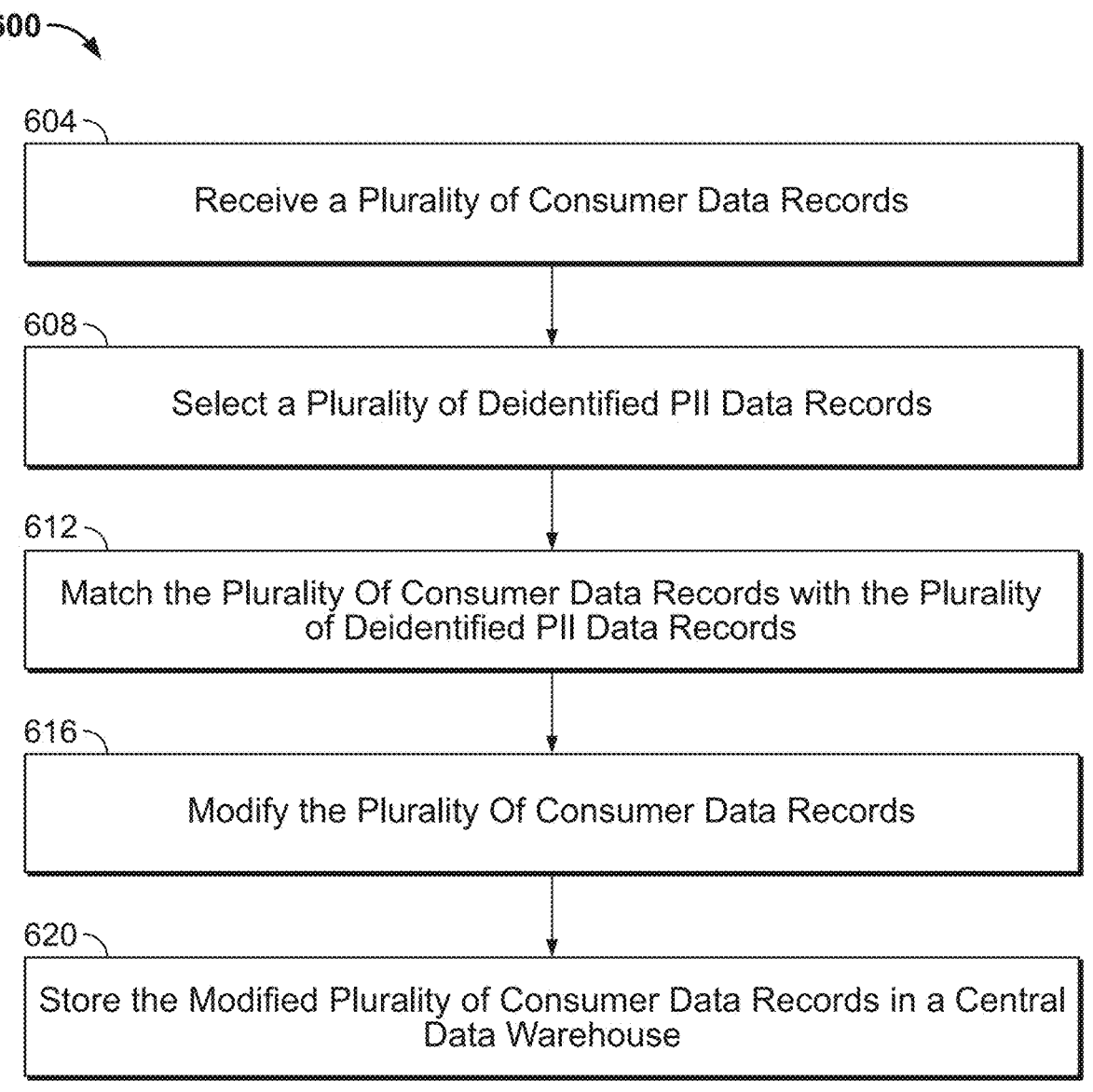
FIG. 6 is a flow diagram of a method for matching consumer data records with deidentified PII data records, according to an example embodiment.

Referring now to FIG. 6, a method 600 of tagging consumer data records with deidentified PII data records is shown, according to an example embodiment. Method 600 can be carried out by the system of FIG. 2. More particularly, the method 600 can be carried out by the ETL computing system 204 of FIG. 1 and through communication with the data merging and linking computing systems 220a-220n, the external data repositories 262a-262n, and the client computing device 266.

Method 600 commences at step 604 at which the ETL computing system 204 receives multiple media exposure data records. The media exposure data records may be received from one or more of the external data repositories or sources 262a-262n and include consumer demographics such as identifying information (e.g., name, date of birth, address), consumer income information, gender information, ethnicity information, age information, and the like. In some embodiments, the media exposure data records may be received from an external data repository (e.g., 262a) operated by a media exposure data management company.

In some embodiments, the received media exposure data records include a token (e.g., an SMC token). In some embodiments, after step 604, the ETL computing system 204 may generate a token for each media exposure data record and add the token to the media exposure data record. In other embodiments, the ETL computing system 204 may provide each media exposure data record to a token generation computing system (not shown), which may generate and add the token to each media exposure data record. In other embodiments, the token generation computing system may return the token for each media exposure data record, which may then be added to the media exposure data record.

Once the ETL computing system 204 has received the media exposure data records, the method 600 proceeds to step 608 at which the ETL computing system 204 selects or determines multiple deidentified PII data records from the central data warehouse 260. In some embodiments, prior to step 608, the ETL computing system 204 may receive or retrieve the deidentified PII file(s) from the file repositories 242a-242n (as discussed with regard to the method 400).

Once the ETL computing system 204 has selected or determined the PII data records, the method 600 proceeds to step 612 at which the ETL computing system 204 matches the media exposure data records with the deidentified PII data records. In some embodiments, the ETL computing system 204 may match the media exposure data records and PII data records based on matching tokens. For instance, the ETL computing system 204 may determine a first deidentified PII data record matches a first media exposure data record based on both data records including the same token. In some embodiments, the ETL computing system 204 may match the media exposure data records and PII data records based on other fields of each record (e.g., date of birth, address, etc.).

Once the ETL computing system 204 has matched the media exposure data records with the deidentified PII data records, the method 600 may proceed to step 616 at which the ETL computing system 204 modifies one or more of the media exposure data records based on the matches of step 612. For instance, the ETL computing system 204 may modify each matched media exposure data record to tag the media exposure data record with the identifier (e.g., UID) of the deidentified PII data record. In one example, the ETL computing system 204 may modify the matched media exposure data record to include the identifier of the matched deidentified PII data record. In other embodiments, the ETL computing system 204 may modify each matched media exposure data record to include a link (e.g., a reference pointer, a uniform resource locator (URL), a hyperlink, etc.) to the matched deidentified PII data record.

In some embodiments, at step 616, the ETL computing system 204 may modify each matched deidentified PHI data record. For instance, the ETL computing system 204 may modify the deidentified PHI data record to tag the deidentified PII data record with the identifier (e.g., UID of the matched media exposure data record. In other embodiments, the ETL computing system 204 may modify each matched deidentified PII data record to include a link (e.g., a reference pointer, a uniform resource locator (URL), a hyperlink, etc.) to the matched media exposure data record.

Once the ETL computing system 204 has modified the matched media exposure data records, the method 600 proceeds to step 620 at which the ETL computing system 204 stores the modified media exposure data records in the central data warehouse 260. For instance, the ETL computing system 204 may add each of the modified media exposure data records to the central data warehouse 260 and discard each non-modified media exposure data record (e.g., the media exposure data records where there was no match).

Figure 7:
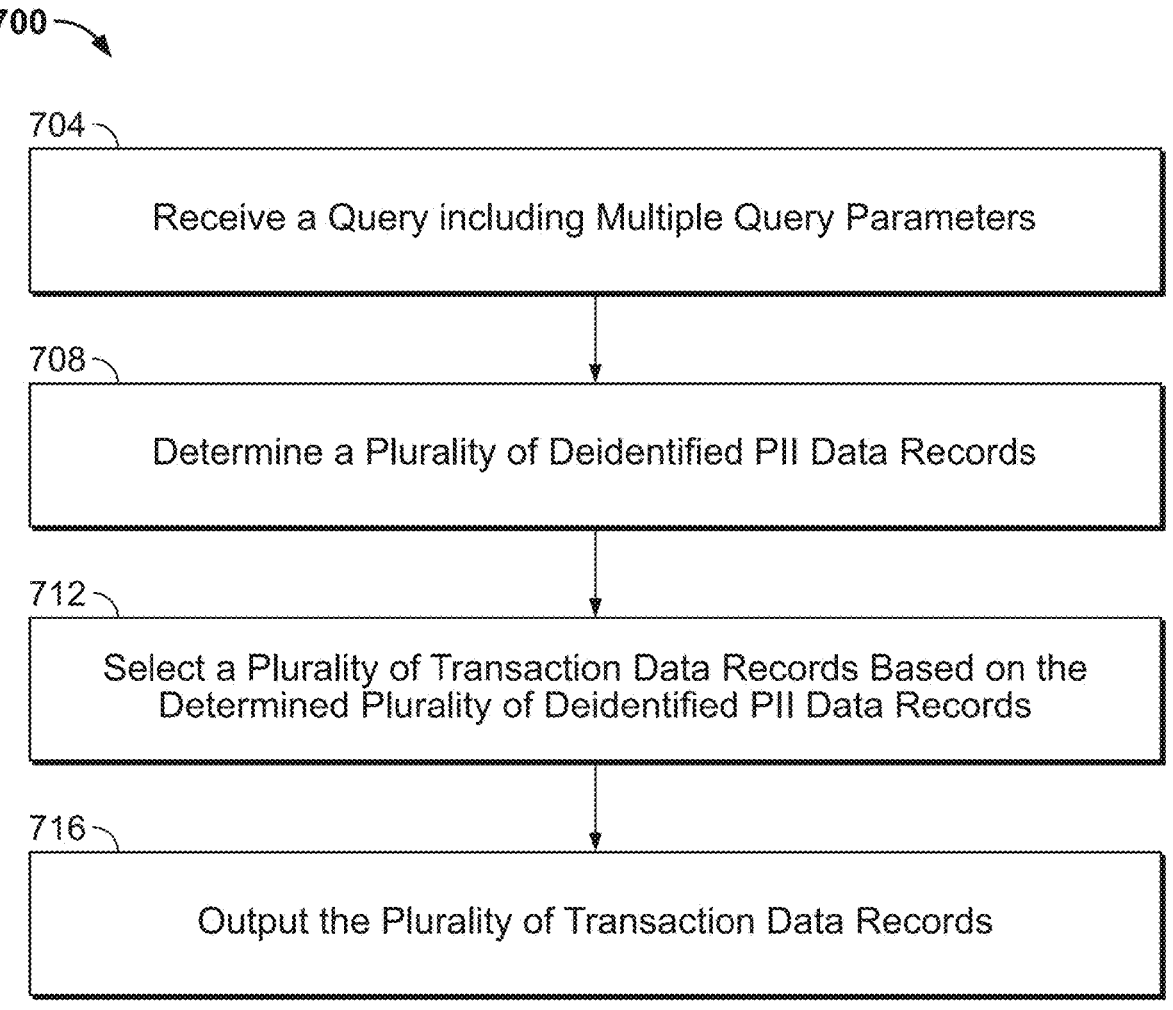
FIG. 7 is a flow diagram of a method for executing a query on a central data warehouse, according to an example embodiment.

Referring now to FIG. 7, a method 700 of executing a query and outputting transaction data records is shown, according to an example embodiment. Method 700 can be carried out by the system of FIG. 2. More particularly, the method 700 can be carried out by the ETL computing system 204 of FIG. 1 and through communication with the data merging and linking computing systems 220a-220n, the external data repositories 262a-262n, and the client computing device 266.

Method 700 commences at step 704 at which the ETL computing system 204 receives a query including multiple query parameters. In some embodiments, the query is received from the client computing device 266. As described herein, each configuration property may be a property or query parameter through which the ETL computing system 204 selects, filters, and refines the (aggregate) data records of the central data warehouse. In some embodiments, the query may include one or more access keys.

For example, a first configuration property may identify or include a medical product (e.g., Drug x) for which data records (e.g., health data records) and/or patient's (who received a prescription for Drug X) data records are sought. In another example, a second configuration property may identify or include a diagnosis code (e.g., code 123) for which data records (e.g., health data records) and/or patients (who received a diagnosis of diagnosis code 123) data records are sought. Other configuration properties will be described further, but may include procedures (e.g., procedure codes), generated or determine attributes (e.g., transaction status or state (e.g., rejected, dispensed, reversed), rejection code classification, a disposition or order of the data record (e.g., interim record, final record, etc.), etc.), timeframes, consumer demographic information (e.g., gender, age range or age, etc.), location (e.g., zip code, state, country, county, etc.), payment type (e.g., private insurance, national health insurance (e.g., Medicare, Medicaid, Medicare part A-D, etc.)), activity or number of occurrences (e.g., a minimum of 5 prescriptions, a prescription at least once a year, a prescription at least once a quarter, maximum of 10 prescriptions, etc.), prescribing HCP specialty (e.g., Pediatrician, Cardiologist, etc.), media exposures, and/or a sequence of one or more configuration properties (e.g., a diagnosis of diagnosis code 123 before (i.e., at an earlier date) than a prescription of Drug X, a prescription of Drug X before a procedure for procedure code 123, etc.).

Once the ETL computing system 204 receives the query, the method 700 proceeds to step 708 at which the ETL computing system 204 determines multiple deidentified PII data records based on the query. For instance, the ETL computing system 204 may execute the query on the central data warehouse 260 to select deidentified PII data records that match the configuration properties of the query. In one example, the query may include a query parameter including a specific consumer demographic value (e.g., age>=35). Accordingly, the ETL computing system 204 may execute the query and determine each consumer demographic data record that matches the query parameter. Then, the ETL computing system 204 may determine the corresponding deidentified PII data record based on the link or tag in the consumer data record. In another example, the query may include a query parameter including a specific media exposure (e.g., received a call advertisement). Accordingly, the ETL computing system 204 may execute the query and determine each media exposure data record that matches the query parameter. Then, the ETL computing system 204 may determine the corresponding deidentified PII data record based on the link or tag in the media exposure data record.

In other embodiments, at step 708, the ETL computing system 204 may execute a first portion of the query to determine the deidentified PII data records, and then after step 708, the ETL computing system 204 may execute a second portion of the query to determine the transaction data records. For instance, the query may include a first query parameter and a second query parameter. Accordingly, at step 708, the ETL computing system 204 may execute the first portion of the query to determine deidentified PII data records based on the first query parameter, then after step 708, the ETL computing system 204 may execute the second portion of the query to determine transaction data records on the second query parameter.

In some embodiments, the ETL computing system 204 may not tag data records, as described with regard to the methods 500 and 600. Instead, the query may include or identify the media exposure data records and/or consumer data records. For instance, the query may include the media exposure data records for which transaction data is sought. In another example, the query may point to a repository or include an access key associated with a specific repository of the central data warehouse 260. Accordingly, at step 708, the ETL computing system 204 may (retrieve the data records, based on verifying the access key(s) and) match the data records of the query with the deidentified PII data records, as described with regard to the methods 500 and 600 (e.g., based on matching tokens). If the query includes multiple types of data records, the ETL computing system 204 may match each set of data records to the deidentified PII data records and then determine which deidentified PII data records match between each set.

In some embodiments, at step 708, the ETL computing system 204 may determine multiple deidentified PII data records and multiple transaction records. For instance, the query may include query parameters that correspond to the transaction data records (e.g., specific medical product, specific diagnostic codes, etc.). Accordingly, when executing the query, the ETL computing system 204 may select or determine deidentified PII data records and transaction data records from the central data warehouse 260. In one example, the query may include a query parameter including a specific medical product (e.g., Drug X). Accordingly, the ETL computing system 204 may execute the query and determine each transaction data record that matches the query parameter.

Once the ETL computing system 204 executes the query to determine multiple deidentified PII data records, the method 700 proceeds to step 712 at which the ETL computing system 204 selects or determines transaction data records based on the determined deidentified PII data records. For instance, at step 712, the ETL computing system 204 may select or retrieve the mapping file (e.g., from the central data warehouse 260). Then, the ETL computing system 204 may determine transaction data records based on the deidentified PII data records and the mapping file. For instance, as described herein, the mapping file may map or correspond specific deidentified PII data records to specific transaction data records. Accordingly, at step 712, the ETL computing system 204 may determine the transaction data records and then retrieve the transaction data records from the central data warehouse 260.

Once the ETL computing system 204 has selected the transaction data records, the method 700 proceeds to step 716 at which the ETL computing system 204 outputs the transaction data records (e.g., the first transaction data records determined at step 708 and the second transaction data records determined and selected at step 712). In some embodiments, the ETL computing system 204 may output the transaction data records to the client computing device 266. In some embodiments, the ETL computing system 204 may generate a file including the transaction data records and then output the file to the client computing device 266.

Referring now to FIG. 8, a method 800 of executing a query and training a digital model is shown, according to an example embodiment. Method 800 can be carried out by the system of FIG. 2. More particularly, the method 800 can be carried out by the ETL computing system 204 of FIG. 1 and through communication with the data merging and linking computing systems 220a-220n, the external data repositories 262a-262n, and the client computing device 266.

Method 800 commences at step 804 at which the ETL computing system 204 receives a query including multiple query parameters. In some embodiments, the query is received from the client computing device 266. As described herein, each configuration property may be a property or query parameter through which the ETL computing system 204 selects, filters, and refines the (aggregate) data records of the central data warehouse. In some embodiments, the query may include one or more access keys.

For example, a first configuration property may identify or include a medical product (e.g., Drug x) for which data records (e.g., health data records) and/or patient's (who received a prescription for Drug X) data records are sought. In another example, a second configuration property may identify or include a diagnosis code (e.g., code 123) for which data records (e.g., health data records) and/or patients (who received a diagnosis of diagnosis code 123) data records are sought. Other configuration properties will be described further, but may include procedures (e.g., procedure codes), generated or determine attributes (e.g., transaction status or state (e.g., rejected, dispensed, reversed), rejection code classification, a disposition or order of the data record (e.g., interim record, final record, etc.), etc.), timeframes, consumer demographic information (e.g., gender, age range or age, etc.), location (e.g., zip code, state, country, county, etc.), payment type (e.g., private insurance, national health insurance (e.g., Medicare, Medicaid, Medicare part A-D, etc.)), activity or number of occurrences (e.g., a minimum of 5 prescriptions, a prescription at least once a year, a prescription at least once a quarter, maximum of 10 prescriptions, etc.), prescribing HCP specialty (e.g., Pediatrician, Cardiologist, etc.), media exposures, and/or a sequence of one or more configuration properties (e.g., a diagnosis of diagnosis code 123 before (i.e., at an earlier date) than a prescription of Drug X, a prescription of Drug X before a procedure for procedure code 123, etc.).

Once the ETL computing system 204 receives the query, the method 800 proceeds to step 808 at which the ETL computing system 204 determines multiple deidentified PII data records based on the query. For instance, the ETL computing system 204 may execute the query on the central data warehouse 260 to select deidentified PII data records that match the configuration properties of the query. In one example, the query may include a query parameter including a specific consumer demographic value (e.g., age>=35). Accordingly, the ETL computing system 204 may execute the query and determine each consumer demographic data record that matches the query parameter. Then, the ETL computing system 204 may determine the corresponding deidentified PII data record based on the link or tag in the consumer data record. In another example, the query may include a query parameter including a specific media exposure (e.g., received a call advertisement). Accordingly, the ETL computing system 204 may execute the query and determine each media exposure data record that matches the query parameter. Then, the ETL computing system 204 may determine the corresponding deidentified PII data record based on the link or tag in the media exposure data record.

In other embodiments, at step 808, the ETL computing system 204 may execute a first portion of the query to determine the deidentified PII data records, and then after step 808, the ETL computing system 204 may execute a second portion of the query to determine the transaction data records. For instance, the query may include a first query parameter and a second query parameter. Accordingly, at step 808, the ETL computing system 204 may execute the first portion of the query to determine deidentified PII data records based on the first query parameter, then after step 808, the ETL computing system 204 may execute the second portion of the query to determine transaction data records on the second query parameter.

In some embodiments, the ETL computing system 204 may not tag data records, as described with regard to the methods 500 and 600. Instead, the query may include or identify the media exposure data records and/or consumer data records. For instance, the query may include the media exposure data records for which transaction data is sought. In another example, the query may point to a repository or include an access key associated with a specific repository of the central data warehouse 260. Accordingly, at step 808, the ETL computing system 204 may (retrieve the data records based on verifying the access key(s) and) match the data records of the query with the deidentified PII data records, as described with regard to the methods 500 and 600 (e.g., based on matching tokens). If the query includes multiple types of data records, the ETL computing system 204 may match each set of data records to the deidentified PII data records and then determine which deidentified PII data records match between each set.

In some embodiments, at step 808, the ETL computing system 204 may determine multiple deidentified PII data records and multiple transaction records. For instance, the query may include query parameters that correspond to the transaction data records (e.g., specific medical product, specific diagnostic codes, etc.). Accordingly, when executing the query, the ETL computing system 204 may select or determine deidentified PII data records and transaction data records from the central data warehouse 260. In one example, the query may include a query parameter including a specific medical product (e.g., Drug X). Accordingly, the ETL computing system 204 may execute the query and determine each transaction data record that matches the query parameter.

Once the ETL computing system 204 executes the query to determine multiple deidentified PII data records, the method 800 proceeds to step 812 at which the ETL computing system 204 selects or determines transaction data records based on the determined deidentified PII data records. For instance, at step 812, the ETL computing system 204 may select or retrieve the mapping file (e.g., from the central data warehouse 260). Then, the ETL computing system 204 may determine transaction data records based on the deidentified PII data records and the mapping file. For instance, as described herein, the mapping file may map or correspond specific deidentified PII data records to specific transaction data records. Accordingly, at step 812, the ETL computing system 204 may determine the transaction data records and then retrieve the transaction data records from the central data warehouse 260.

In some embodiments, the query may include an access key associated with a digital model. Accordingly, the ETL computing system 204 may verify the access key and retrieve the digital model from a digital model repository (not shown) based on the verified access key. The digital model may be a machine learning model configured to determine one or more statistical values based on the data records described herein. Accordingly, after step 804 and receiving the query, the ETL computing system 204 may retrieve the digital model. In some embodiments, the digital model repository may store a digital model program which is a program or set of executable instructions that selects feature data, trains the digital model, and uses the digital model to generate the statistical values. Accordingly, each of the steps 816-824 may be performed based on our using the retrieved digital model program.

Once the ETL computing system 204 selects or determines transaction data record, the method 800 proceeds to step 816 at which the ETL computing system 204 determines feature data based on one or more of: the determined deidentified PII data records, the selected transaction data records, the data records of the query, and/or the query parameters.

The feature data is features or portions of the data records that may specifically influence the statistical values and is used to train the digital model. In this this regard, the ETL computing system 204 may determine and pick feature data from among the various data records described herein. Moreover, feature data may be model specific, such that a first model selects different data records as feature data when compared to a second model.

Feature selection may included two parts including pre-selected or manually selected feature selection and machine or machine learning (ML) selected feature selection. Pre-selected or manually selected feature selection of the feature data may take place prior to or after ML feature selection. In some embodiments, manually selected feature data may be pre-selected (as indicated in the digital model program or in the query) to learn the effect the specific features have on the statistical values. For example, manually selected feature data may include any of the first feature information described herein including media exposure data records (and the fields thereof), HCP data records (and the fields thereof), transaction data records (and the fields thereof), and so on).

In comparison, ML feature selection may be performed by ETL computing system 204, to select various features based on applicability and effect on the statistical values. For example, through various methods the ETL computing system 204 may determine that specific features have an effect. In one instance, the ETL computing system 204 may determine that two or more types of data records (or fields thereof) are linearly dependent or non-informative such that only one of the features needs to be included in the feature data. An example of linearly dependent fields may be age and date of birth. To select ML selected feature data from among the data records descried herein (and the fields thereof), the ETL computing system 204 may use one or more ML feature selection techniques such as filter methods, wrapper methods, embedded methods, or other hybrid methods.

Filter methods pick up intrinsic properties of possible features (i.e., the aggregate information) measured via uni-variate statistics. Examples of filter methods include the information gain method, the chi-square test method, Fisher's score method, the correlation coefficient method, the variance threshold method, the mean absolute difference method, and the dispersion ratio method. In comparison, wrapper methods search the space of all possible subsets of features, assessing their quality by learning and evaluating a ML model with that feature subset. Examples of wrapper methods include the forward feature selection method, the backward feature elimination method, the exhaustive feature selection method, and the recursive feature elimination method. Embedded methods are similar to both the wrapper and filter methods by looking at interactions between features while also minimizing computational cost. Examples of embedded methods include the LASSO regularization method and the random forest importance method. Hybrid methods combine one or more filter methods, wrapper methods, or embedded methods.

In one example, the ETL computing system 204 may determine ML selected feature data using multiple stages of feature selection. For instance, the ETL computing system 204 may first (i.e., at the first stage) determine the variance for each of the features and remove any features with substantially zero variance. Next, the ETL computing system 204 may determine the fill rate or fill count for each of the features and remove features that have low fill rate (e.g., 3% or less). For example, the ETL computing system 204 may determine the total number (e.g., the sum) of non-zero values for a feature and divide it by the total number of that feature. If that total number of non-zero values or percentage is under a threshold value or percentage, the feature may be removed. Next, the ETL computing system 204 may remove correlated (i.e., linearly dependent) features using variance inflation (VIF). VIF is the ratio of the variance of a feature in a model that includes other terms by the variance of the model constructed using only one term, and thereby quantifies the severity of multicollinearity of a feature. In this regard, the higher the VIF, the more the feature is correlated with other features. In some embodiments, if the VIF of a feature is above 10 or above 5, the feature is removed from the feature data by the ETL computing system 204. Next, the ETL computing system 204 may rank may reduce the number of features to a specific value (e.g., under 50 features or 25-50 features (e.g., 20 features, 25 features, 30 features, 35 features, 50 features, etc.) using a regularizing gradient boosting framework (e.g., XGBoost) and fit the data by minimizing binary classification error rate (e.g., the number of incorrect predictions based upon the aggregate information).

In some embodiments, the ETL computing system 204 may further use or apply principle component analysis to reduce dimensionality and correlation between non-media exposure features of the first feature information. PCA is an unsupervised technique to reduce dimensionality and correlation between features. In this regard, by utilizing PCA, the ETL computing system 204 may significantly reduce the number of features in the final model which helps mitigate collinearity issues. By doing so, the ETL computing system 204 lowers computation time and requires less processing power and memory, as compared to typical systems. In some embodiments, after determining the feature data, the ETL computing system 204 may store the feature data in the feature data repository 262.

Once the ETL computing system 204 has determined feature data including multiple features, the method 800 may proceed to step 820 at which the ETL computing system 204 generates (i.e., trains or determines) the digital model. The digital model may be determined by fitting the feature data to one or more of the data records to generate one or more model values or coefficients. For instance, the ETL computing system 204 may fit the feature data to the determined transaction data records. In this regard, the feature data may be considered the independent variables (e.g., the inputs) and the data records (e.g., the transaction data records) may be considered the dependent variables (e.g., the outcomes).

The digital model may be generated by fitting the independent variables or inputs (e.g., the feature data) to the dependent variables or outcomes (e.g., the selected transaction data records) using the digital model (e.g., a binomial regression model, a logistic regression model, or other regression analysis models) to determine or generate coefficients for each feature of the first feature information. The coefficients may represent the fit of the digital model and be used to thereafter generate statistical values.

Once the ETL computing system 204 has generated the digital model, the method 800 proceeds to step 824 at which the ETL computing system 204 determines one or more statistical values (also referred to as values) using the generated digital model. For instance, the ETL computing system 204 may determine statistical values based on the data records described herein and the model coefficients using the digital model. In some embodiments, after generating the values, the ETL computing system 204 may generate a file and populate the file with the values. In some embodiments, after generating the values and/or the file, the ETL computing system 204 may output the values and/or the file. In some embodiments, the ETL computing system 204 may store the values in the central data warehouse 260.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FBGAs), digital signal processors (DSPs), or other suitable electronic data processing components structured to execute instructions provided by the memory. The one or more processors may take the form of a single core processor, a multi-core processor (e.g., dual core, quad core, etc.), micro-processor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for secure matching of data records in a data merging and linking computing system, wherein the data merging and linking computing system includes an identified domain and a deidentified domain, wherein the identified domain processes and stores personally identifiable information (PII), wherein the deidentified domain does not process or store the PII, and wherein the method comprises:

receiving, by the data merging and linking computing system, a plurality of data records in the identified domain;

modifying, by the data merging and linking computing system, the plurality of data records to generate a plurality of PII data records and a plurality of transaction data records in the identified domain;

linking, by the data merging and linking computing system, the plurality of PII data records with the plurality of transaction data records by generating a mapping file in the identified domain;

normalizing, by the data merging and linking computing system, the plurality of transaction data records in the identified domain;

normalizing, by the data merging and linking computing system, the plurality of PII data records in the identified domain;

generating, by the data merging and linking computing system and in the identified domain, a PII key for each PII data record of the plurality of PII data records;

matching, by the data merging and linking computing system and in the identified domain, at least two PII keys of the plurality of PII keys;

merging, by the data merging and linking computing system and in the identified domain, at least two PII data records of the plurality of PII data records based on the matched at least two PII keys to generate at least one merged PII data record;

modifying, by the data merging and linking computing system, a resulting set of PII data records to deidentify the resulting set of PII data records and generate a plurality of deidentified PII data records, wherein the resulting set of PII data records includes one or more PII data records of the plurality of PII data records and the at least one merged PII data record;

outputting, by the data merging and linking computing system and in the identified domain, at least a portion of each deidentified PII data record of the plurality of deidentified PII data records;

received, by the data merging and linking computing system and in the identified domain, a plurality of tokens;

modifying, by the data merging and linking computing system and in the identified domain, each deidentified PII data record of the plurality of deidentified PII data records to include a token of the plurality of tokens; and storing, by the data merging and linking computing system, the plurality of deidentified PII data records, the plurality of normalized transaction data records, and the mapping file in at least one repository in the deidentified domain.

2. The method of claim 1, wherein each PII data record of the resulting set of PII data records includes a plurality of fields, and wherein modifying the resulting set of PII data records comprises:

encrypting, by the data merging and linking computing system, each field of the plurality of fields of the resulting set of PII data records to generate the plurality of deidentified PH data records.

3. The method of claim 1, wherein each PII data record of the resulting set of PII data records includes a plurality of fields, and wherein modifying the resulting set of PII data records comprises:

hashing, by the data merging and linking computing system, each field of the plurality of fields of the resulting set of PII data records to generate the plurality of deidentified PII data records.

4. The method of claim 1, wherein each transaction data record of the plurality of transaction data records includes a first unique identifier (UID), wherein each PII data record of the plurality of PII data records includes a second UID, and wherein the mapping file links the plurality of PII data records with the plurality of transaction data records by including at least one first UID associated with at least one second UID.

5. The method of claim 1, wherein each PII data record of the plurality of PII data records includes a plurality of fields, and wherein generating the PII key for each PII data record of the plurality of PII data records comprises:

selecting, by the data merging and linking computing system and for each PII data record of the plurality of PII data records, a first field and a second field of the plurality of fields; and combining, by the data merging and linking computing system and for each PII data record of the plurality of PII data records, the first field and the second field to generate the PII key.

6. The method of claim 1, wherein the identified domain processes and stores protected health information (PHI) including the PII, and wherein the deidentified domain does not process or store the PHI.

7. The method of claim 1, wherein the identified domain includes a first repository, and wherein the method further comprises:

encrypting, by the data merging and linking computing system and in the identified domain, the plurality of data records using a first encryption algorithm;

storing, by the data merging and linking computing system and in the identified domain, the plurality of encrypted data records;

encrypting, by the data merging and link computing system and in the deidentified domain, the plurality of deidentified PII data records, the plurality of normalized transaction data records, and the mapping file using a second encryption algorithm; and storing, by the data merging and linking computing system, the encrypted plurality of deidentified PII data records, the encrypted plurality of normalized transaction data records, and the encrypted mapping file in the at least one repository in the deidentified domain.

8. A method for secure matching of data records in a data merging and linking computing system, wherein the data merging and linking computing system includes an identified domain and a deidentified domain, wherein the identified domain processes and stores personally identifiable information (PII), wherein the deidentified domain does not process or store PII, and wherein the method comprises:

receiving, by the data merging and linking computing system, a plurality of data records in the identified domain;

modifying, by the data merging and linking computing system, the plurality of data records to generate a plurality of PII data records and a plurality of transaction data records in the identified domain;

linking, by the data merging and linking computing system, the plurality of PII data records with the plurality of transaction data records by generating a plurality of mapping data records in the identified domain;

normalizing, by the data merging and linking computing system, the plurality of transaction data records in the identified domain;

normalizing, by the data merging and linking computing system, the plurality of PII data records in the identified domain;

generating, by the data merging and linking computing system and in the identified domain, a PII key for each PII data record of the plurality of PII data records;

matching, by the data merging and linking computing system and in the identified domain, at least two PII keys of the plurality of PII keys;

merging, by the data merging and linking computing system and in the identified domain, at least two PII data records of the plurality of PII data records based on the matched at least two PII keys to generate at least one merged PII data record;

modifying, by the data merging and linking computing system, a resulting set of PII data records to deidentify the resulting set of PII data records and generate a plurality of deidentified PII data records, wherein the resulting set of PII data records includes one or more PII data records of the plurality of PII data records and the at least one merged PII data record;

generating, by the data merging and linking computing system and in the identified domain, a token for each deidentified PII data record of the plurality of deidentified PII data records; and modifying, by the data merging and linking computing system and in the identified domain, each deidentified PII data record of the plurality of deidentified PII data records to include the token; and storing, by the data merging and linking computing system, the plurality deidentified PII data records, the plurality of normalized transaction data records, and the plurality of mapping data records in at least one repository in the deidentified domain.

9. The method of claim 8, wherein each PII data record of the resulting set of PII data records includes a plurality of fields, and wherein modifying the resulting set of PII data records comprises:

encrypting, by the data merging and linking computing system, each field of the plurality of fields of the resulting set of PII data records to generate the plurality of deidentified PII data records.

10. The method of claim 8, wherein each PII data record of the resulting set of PII data records includes a plurality of fields, and wherein modifying the resulting set of PII data records comprises:

hashing, by the data merging and linking computing system, each field of the plurality of fields of the resulting set of PII data records to generate the plurality of deidentified PII data records.

11. The method of claim 8, wherein each transaction data record of the plurality of transaction data records includes a first unique identifier (UID), wherein each PII data record of the plurality of PII data records includes a second UID, and wherein each mapping data record of the plurality of mapping data records includes at least one first UID associated with at least one second UID.

12. The method of claim 8, wherein each PII data record of the plurality of PII data records includes a plurality of fields, and wherein generating the PII key for each PII data record of the plurality of PII data records comprises:

selecting, by the data merging and linking computing system and for each PII data record of the plurality of PII data records, a first field and a second field of the plurality of fields; and combining, by the data merging and linking computing system and for each PII data record of the plurality of PII data records, the first field and the second field to generate the PII key.

13. The method of claim 8, wherein the identified domain processes and stores protected health information (PHI) including the PII, and wherein the deidentified domain does not process or store the PHI.

14. The method of claim 8, wherein the identified domain includes a first repository, and wherein the method further comprises:

encrypting, by the data merging and linking computing system and in the identified domain, the plurality of data records using a first encryption algorithm;

storing, by the data merging and linking computing system and in the identified domain, the plurality of encrypted data records;

encrypting, by the data merging and link computing system and in the deidentified domain, the plurality deidentified PII data records, the plurality of normalized transaction data records, and the plurality of mapping data records using a second encryption algorithm; and storing, by the data merging and linking computing system, the encrypted plurality of deidentified PII data records, the encrypted plurality of normalized transaction data records, and the encrypted the plurality of mapping data records in the at least one repository in the deidentified domain.

15. A non-transitory computer readable medium having computer executable instructions embodied therein that, when executed by at least one processor of a computing system, cause the computing system to perform operations to perform secure matching of data records, the operations comprising:

receiving a plurality of data records in an identified domain of the computing system, wherein the identified domain stores personally identifiable information (PII);

modifying the plurality of data records to generate a plurality of PH data records and a plurality of transaction data records in the identified domain;

linking the plurality of PII data records with the plurality of transaction data records by generating a mapping file in the identified domain;

normalizing the plurality of transaction data records in the identified domain;

normalizing the plurality of PII data records in the identified domain;

generating, in the identified domain, a PII key for each PII data record of the plurality of PII data records;

matching, in the identified domain, at least two PII keys of the plurality of PII keys;

merging, in the identified domain, at least two PII data records of the plurality of PII data records based on the matched at least two PII keys to generate at least one merged PII data record;

modifying a resulting set of PII data records to deidentify the resulting set of PII data records and generate a plurality of deidentified PII data records, wherein the resulting set of PII data records includes one or more PII data records of the plurality of PII data records and the at least one merged PH data record, and wherein each deidentified PH data record of the plurality of deidentified PH data records includes a token; and storing the plurality deidentified PII data records, the plurality of normalized transaction data records, and the mapping file in at least one repository in the deidentified domain of the computing system, wherein the deidentified domain does not store PII.

16. The non-transitory computer readable medium of claim 15, wherein each PII data record of the resulting set of PII data records includes a plurality of fields, and wherein modifying the resulting set of PII data records comprises:

encrypting each field of the plurality of fields of the resulting set of PII data records to generate the plurality of deidentified PII data records.

17. The non-transitory computer readable medium of claim 15, wherein each PII data record of the resulting set of PII data records includes a plurality of fields, and wherein modifying the resulting set of PII data records comprises:

hashing each field of the plurality of fields of the resulting set of PII data records to generate the plurality of deidentified PII data records.

18. The non-transitory computer readable medium of claim 15, wherein the operations further comprise:

outputting, in the identified domain, at least a portion of each deidentified PII data record of the plurality of deidentified PII data records; and receiving, in the identified domain, a plurality of tokens; and modifying, in the identified domain, each deidentified PII data record of the plurality of deidentified PII data records to include a token of the plurality of tokens.

19. The non-transitory computer readable medium of claim 15, wherein the operations further comprises:

generating, in the identified domain, the token for each deidentified PII data record of the plurality of deidentified PH data records; and modifying, in the identified domain, each deidentified PH data record of the plurality of deidentified PII data records to include the token.

20. The non-transitory computer readable medium of claim 15, wherein each transaction data record of the plurality of transaction data records includes a first unique identifier (UID), wherein each PII data record of the plurality of PII data records includes a second UID, and wherein the mapping file links the plurality of PII data records with the plurality of transaction data records by including at least one first UID associated with at least one second UID.

* * * * *